United States Patent
Flowers et al.

(10) Patent No.: US 10,977,725 B1
(45) Date of Patent: Apr. 13, 2021

(54) PREVENTING ACCOUNT OVERDRAFTS AND EXCESSIVE CREDIT SPENDING

(71) Applicant: STATE FARM MUTUAL AUTOMOBILE INSURANCE COMPANY, Bloomington, IL (US)

(72) Inventors: Elizabeth Flowers, Bloomington, IL (US); Puneit Dua, Bloomington, IL (US); Alan Zwilling, Downs, IL (US); Adam Mattingly, Normal, IL (US); Melissa Attig, Bloomington, IL (US); Reena Batra, Alpharetta, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 450 days.

(21) Appl. No.: 15/498,740

(22) Filed: Apr. 27, 2017

Related U.S. Application Data

(60) Provisional application No. 62/436,899, filed on Dec. 20, 2016, provisional application No. 62/436,883, filed on Dec. 20, 2016, provisional application No. 62/341,677, filed on May 26, 2016, provisional application No. 62/338,749, filed on May 19, 2016,
(Continued)

(51) Int. Cl.
*G06Q 40/02* (2012.01)
*G06Q 30/02* (2012.01)

(52) U.S. Cl.
CPC ......... *G06Q 40/02* (2013.01); *G06Q 30/0205* (2013.01)

(58) Field of Classification Search
None
See application file for complete search history.

(56) References Cited

U.S. PATENT DOCUMENTS

| 5,945,653 A | 8/1999 | Walker et al. |
| 6,185,543 B1 | 2/2001 | Galperin et al. |
| (Continued) | | |

FOREIGN PATENT DOCUMENTS

WO   WO2009134817 A1   11/2009

OTHER PUBLICATIONS

U.S. Appl. No. 15/498,772, filed Apr. 27, 2017, Flowers et al., "Preventing Account Overdrafts and Excessive Credit Spending".
(Continued)

*Primary Examiner* — Akosua Kyereme-Tuah
(74) *Attorney, Agent, or Firm* — Lee & Hayes, P.C.

(57) ABSTRACT

Techniques are disclosed utilizing cognitive computing to improve banking experiences. A user's financial account(s) may be monitored to predict when a surplus of funds is unnecessarily present and for how long this will likely be the case. Once this is determined, techniques include automatically drafting funds from the account to another account having a higher interest rate where the funds may accrue more interest. The techniques also include predicting when an overdraft may occur and taking appropriate action when such a prediction is made. Predictions may be based upon different weighted inputs used in accordance with a predictive modeling system, which may attempt to predict for a particular user, location, and retailer, whether the user will spend an anticipated amount in excess of the user's current balance. If so, passive (e.g., notifications) and active (e.g., transferring cover funds) actions may be performed.

20 Claims, 14 Drawing Sheets

Related U.S. Application Data provisional application No. 62/338,752, filed on May 19, 2016, provisional application No. 62/332,226, filed on May 5, 2016.

(56) References Cited

U.S. PATENT DOCUMENTS

| | | | |
|---|---|---|---|
| 6,341,353 B1 | 1/2002 | Herman et al. | |
| 6,450,407 B1 | 9/2002 | Freeman et al. | |
| 6,571,279 B1 | 5/2003 | Herz et al. | |
| 6,611,811 B1 | 8/2003 | Deaton et al. | |
| 6,719,197 B2 | 4/2004 | Yajima | |
| 6,839,682 B1 | 1/2005 | Blume et al. | |
| 6,954,732 B1 | 10/2005 | DeLapa et al. | |
| 7,035,855 B1 | 4/2006 | Kilger et al. | |
| 7,089,503 B1 | 8/2006 | Bloomquist et al. | |
| 7,472,088 B2 | 12/2008 | Taylor et al. | |
| 7,617,156 B1 | 11/2009 | Wolfson | |
| 7,771,278 B1 | 8/2010 | Muskin | |
| 7,873,571 B1 | 1/2011 | Wehmer | |
| 8,364,522 B1 | 1/2013 | Gevelber | |
| 8,503,634 B1 | 8/2013 | Townsend, III et al. | |
| 8,655,726 B1 | 2/2014 | Favero et al. | |
| 8,744,946 B2 | 6/2014 | Shelton | |
| 2002/0073043 A1 | 6/2002 | Herman et al. | |
| 2002/0138343 A1 | 9/2002 | Weatherford et al. | |
| 2002/0138346 A1 | 9/2002 | Kodaka et al. | |
| 2003/0061097 A1 | 3/2003 | Walker et al. | |
| 2003/0158844 A1 | 8/2003 | Kramer et al. | |
| 2003/0182191 A1 | 9/2003 | Oliver et al. | |
| 2003/0212595 A1 | 11/2003 | Antonucci | |
| 2003/0229585 A1 | 12/2003 | Butler | |
| 2004/0015395 A1 | 1/2004 | Acosta | |
| 2004/0056101 A1 | 3/2004 | Barkan et al. | |
| 2004/0088221 A1 | 5/2004 | Katz et al. | |
| 2004/0117300 A1 | 6/2004 | Jones et al. | |
| 2004/0122736 A1 | 6/2004 | Strock et al. | |
| 2005/0144105 A1 | 6/2005 | Czyzewski | |
| 2005/0159996 A1 | 7/2005 | Lazarus et al. | |
| 2006/0111978 A1 | 5/2006 | Tietzen et al. | |
| 2006/0143079 A1 | 6/2006 | Basak et al. | |
| 2006/0242011 A1 | 10/2006 | Bell et al. | |
| 2007/0050258 A1 | 3/2007 | Dohse | |
| 2007/0094134 A1* | 4/2007 | Kalra | G06Q 40/00 705/40 |
| 2007/0106558 A1* | 5/2007 | Mitchell | G06Q 20/209 705/16 |
| 2007/0192183 A1 | 8/2007 | Monaco et al. | |
| 2007/0198354 A1 | 8/2007 | Senghore et al. | |
| 2007/0244741 A1* | 10/2007 | Blume | G06Q 30/0255 705/7.31 |
| 2008/0004888 A1 | 1/2008 | Davis et al. | |
| 2008/0059307 A1 | 3/2008 | Fordyce, III et al. | |
| 2008/0071700 A1 | 3/2008 | Catalano-Johnson | |
| 2008/0077487 A1 | 3/2008 | Davis et al. | |
| 2008/0086365 A1 | 4/2008 | Zollino et al. | |
| 2008/0086426 A1* | 4/2008 | Dilip | G06Q 20/023 705/75 |
| 2008/0103887 A1 | 5/2008 | Oldham et al. | |
| 2008/0248815 A1 | 10/2008 | Busch | |
| 2008/0313092 A1 | 12/2008 | Lanham et al. | |
| 2009/0006183 A1 | 1/2009 | Paintin et al. | |
| 2009/0037264 A1 | 2/2009 | Del Favero et al. | |
| 2009/0112707 A1 | 4/2009 | Weiss et al. | |
| 2009/0164382 A1 | 6/2009 | Sally | |
| 2009/0164420 A1* | 6/2009 | Srivastava | G06Q 30/0205 |
| 2009/0276368 A1 | 11/2009 | Martin et al. | |
| 2009/0299865 A1 | 12/2009 | Budgen | |
| 2010/0106644 A1 | 4/2010 | Annan et al. | |
| 2010/0161379 A1 | 6/2010 | Bene et al. | |
| 2010/0211431 A1 | 8/2010 | Lutnick et al. | |
| 2010/0228604 A1 | 9/2010 | Desai et al. | |
| 2011/0060808 A1 | 3/2011 | Martin et al. | |
| 2011/0093324 A1 | 4/2011 | Fordyce, III et al. | |
| 2011/0270661 A1 | 11/2011 | Heiser, II et al. | |
| 2011/0270779 A1 | 11/2011 | Showalter | |
| 2012/0010932 A1 | 1/2012 | Satyavolu et al. | |
| 2012/0016817 A1 | 1/2012 | Smith et al. | |
| 2012/0078706 A1 | 3/2012 | Rajagopalan | |
| 2012/0084177 A1* | 4/2012 | Tanaka | G06Q 30/0613 705/26.41 |
| 2013/0054334 A1 | 2/2013 | Ross et al. | |
| 2013/0124281 A1 | 5/2013 | Evans et al. | |
| 2013/0166386 A1 | 6/2013 | Simmons | |
| 2013/0166445 A1 | 6/2013 | Isaacson et al. | |
| 2013/0191195 A1 | 7/2013 | Carlson et al. | |
| 2013/0191213 A1 | 7/2013 | Beck et al. | |
| 2013/0238413 A1 | 9/2013 | Carlson et al. | |
| 2013/0253983 A1 | 9/2013 | Lawton et al. | |
| 2013/0254035 A1 | 9/2013 | Ramer et al. | |
| 2014/0052595 A1 | 2/2014 | Zimmer et al. | |
| 2014/0085180 A1 | 3/2014 | Bender et al. | |
| 2014/0095302 A1 | 4/2014 | Monteverde | |
| 2014/0129322 A1 | 5/2014 | George et al. | |
| 2014/0156396 A1 | 6/2014 | deKozan et al. | |
| 2014/0244470 A1 | 8/2014 | Aron | |
| 2014/0274307 A1 | 9/2014 | Gonzalez | |
| 2014/0279015 A1 | 9/2014 | Root et al. | |
| 2014/0344019 A1 | 11/2014 | Thalken | |
| 2015/0073909 A1 | 3/2015 | Peden et al. | |
| 2015/0134511 A1 | 5/2015 | Ghosh et al. | |
| 2015/0186871 A1 | 7/2015 | Laracey | |
| 2015/0220999 A1 | 8/2015 | Thornton et al. | |
| 2015/0261986 A1 | 9/2015 | Ekbatani et al. | |
| 2016/0232546 A1 | 8/2016 | Ranft et al. | |
| 2017/0178189 A1 | 6/2017 | Hu et al. | |
| 2017/0255998 A1 | 9/2017 | Ameriks et al. | |
| 2017/0323345 A1 | 11/2017 | Flowers et al. | |

OTHER PUBLICATIONS

U.S. Appl. No. 15/498,828, filed Apr. 27, 2017, Flowers et al., "Customizing Loan Specifics on a Per-User Basis".

U.S. Appl. No. 15/498,872, filed Apr. 27, 2017, Flowers et al., "Using Cognitive Computing to Provide Targeted Offers for Preferred Products to a User Via a Mobile Device".

U.S. Appl. No. 15/499,061, filed Apr. 27, 2017, Flowers et al., "Predicting When a User is in Need of a Loan and Notifying the User of Loan Offers".

U.S. Appl. No. 15/499,089, filed Apr. 27, 2017, Flowers et al., "Using Cognitive Computing to Provide a Personalized Banking Experience".

U.S. Appl. No. 15/499,150, filed Apr. 27, 2017, Flowers et al., "Using Cognitive Computing to Improve Relationship Pricing".

U.S. Appl. No. 15/499,203, filed Apr. 27, 2017, Flowers et al., "Using Cognitive Computing for Presenting Targeted Loan Offers".

U.S. Appl. No. 15/499,205, filed Apr. 27, 2017, Flowers et al., "Cognitive Computing for Generating Targeted Offers to Inactive Account Holders".

Office Action for U.S. Appl. No. 15/498,772, dated Oct. 11, 2019, Flowers, et al., "Optimizing Interest Accrual Between a User's Financial Accounts", 39 pages.

Office Action for U.S. Appl. No. 15/499,061, dated Oct. 21, 2019, Flowers, et al., "Using Cognitive Computing to Provide a Personalized Banking Experience", 15 pages.

Office Action for U.S. Appl. No. 15/498,872, dated Nov. 16, 2018, Flowers, et al., "Cognitive Computing for Generating Targeted Offers to Inactive Account Holders", 17 pages.

Office Action for U.S. Appl. No. 15/498,828, dated Dec. 26, 2018, Flowers, et al., "Using Cognitive Computing to Provide Targeted Offers for Preferred Products to a User Via a Mobile Device", 16 pages.

Office Action for U.S. Appl. No. 15/499,205, dated Dec. 30, 2019, Flowers, "Using Cognitive Computing to Improve Relationship Pricing", 36 pages.

Office Action for U.S. Appl. No. 15/499,150, dated Feb. 14, 2020, Flowers, et al., "Using Cognitive Computing for Presenting Targeted Loan Offers", 16 pages.

Office Action for U.S. Appl. No. 15/498,872, dated Feb. 24, 2020, Flowers, et al., "Cognitive Computing for Generating Targeted Offers for Inactive Account Holders", 16 pages.

(56) References Cited

OTHER PUBLICATIONS

Office Action for U.S. Appl. No. 15/499,203, dated Feb. 5, 2020, Flowers, "Customizing Loan Specifics on a Per-User Basis", 19 pages.
Office Action for U.S. Appl. No. 15/498,772, dated Apr. 8, 2019, Flowers, et al., "Optimizing Interest Accrual Between a Users Financial Accounts", 31 pages.
Office Action for U.S. Appl. No. 15/498,872, dated May 2, 2019, Flowers, et al., "Cognitive Computing for Generating Targeted Offers for Inactive Account Holders", 16 pages.
Office Action for U.S. Appl. No. 15/498,828, dated May 6, 2019, Flowers, et al., "Using Cognitive Computing to Provide Targeted Offers for Preferred Products to a User Via a Mobile Device", 15 pages.
Office Action for U.S. Appl. No. 15/499,150, dated Jul. 22, 2019, Flowers, et al., "Using Cognitive Computing for Presenting Targeted Loan Offers", 13 pages.
Office Action for U.S. Appl. No. 15/499,203, dated Jul. 22, 2019, Flowers, "Customizing Loan Specifics on a Per-User Basis," 19 pages.
Office Action for U.S. Appl. No. 15/498,872, dated Sep. 12, 2019, Flowers, et al., "Cognitive Computing for Generating Targeted Offers for Inactive Account Holders", 16 pages.
Office Action for U.S. Appl. No. 15/499,089, dated Sep. 12, 2019, Flowers, "Predicting When a User is in Need of a Loan and Notifying the User of Loan Offers," 18 pages.
Office Action for U.S. Appl. No. 15/498,828, dated Sep. 17, 2019, Flowers, et al., "Using Cognitive Computing to Provide Targeted Offers for Preferred Products to a User Via a Mobile Device", 16 pages.
Office Action for U.S. Appl. No. 15/498,828, dated Feb. 27, 2020, Flowers, "Using Cognitive Computing to Provide Targeted Offers for Preferred Products to a User Via a Mobile Device," 15 pages.
Final Office Action dated Apr. 27, 2020 for U.S. Appl. No. 15/499,061 "Using Cognitive Computing to Provide a Personalized Banking Experience" Flowers, 21 pages.
Office Action for U.S. Appl. No. 15/499,089, dated Apr. 6, 2020, Flowers, "Predicting When a User is in Need of a Loan and Notifying the User of Loan Offers," 18 pages.
Bigne, et al., "The impact of internet user shopping patterns and demographics on consumer mobile buying behaviour" Journal of Electronic Commerce Research, vol. 6, No. 3, Jan. 2005, 18 Pages.
Non Final Office Action dated Jun. 12, 2020 for U.S. Appl. No. 15/499,150 "Using Cognitive Computing for Resenting Targeted Loan Offers" Flowers, 17 pages.
Non Final Office Action dated Jun. 5, 2020 for U.S. Appl. No. 15/499,203 "Customizing Loan Specifics on a Per-User Basis" Flowers, 24 pages.
Final Office Action dated Dec. 17, 2020 for U.S. Appl. No. 15/499,203, "Customizing Loan Specifics on a Per-User Basis", Flowers, 26 pages.
Bose, et. al., "Business data mining—a machine learning perspective", Information & Management 2001, V 39, p. 211-225.
Bounsaythip, et. al., "Overview of Data Mining for Customer Behavior Modeling", VTT Information Technology, Jun. 29, 2001, 59 pages.
Zhang, et. al., "Discovering Gold Nuggets: Data Mining in Financial Application", IEEE Transacitons on Systems, Man, and Cybernetics, Part C, vol. 34, No. 4, Nov. 2004, pp. 513-522.
Office Action for U.S. Appl. No. 15/499,061, dated Feb. 19, 2021. Flowers, "Using Cognitive Computing Provide to Personalized Banking Experience", 26 pages.
Non Final Office Action dated Sep. 24, 2020 for U.S. Appl. No. 15/499,061, "Using Cognitive Computing to Provide a Personalized Banking Experience", Flowers, 22 pages.
Office Action dated Oct. 29, 2020 for U.S. Appl. No. 15/499,089 "Predicting When a User is in Need of a Loan and Notifying the User of Loan Offers", Flowers, 21 pages.

* cited by examiner

PREVENTING ACCOUNT OVERDRAFTS AND EXCESSIVE CREDIT SPENDING

CROSS REFERENCE TO RELATED APPLICATIONS

This application claims priority to (1) U.S. Provisional Application No. 62/338,749, entitled "Using Cognitive Computing To Customize Loans," filed on May 19, 2016; (2) U.S. Provisional Application No. 62/332,226, entitled "Using Cognitive Computing To Provide a Personalized Banking Experience," filed on May 5, 2016; (3) U.S. Provisional Application No. 62/338,752, entitled "Using Cognitive Computing To Provide a Personalized Banking Experience," filed on May 19, 2016; (4) U.S. Provisional Application No. 62/341,677, entitled "Using Cognitive Computing To Improve Relationship Pricing," filed on May 26, 2016; (5) U.S. Provisional Application No. 62/436,899, entitled "Using Cognitive Computing To Improve Relationship Pricing," filed on Dec. 20, 2016; and (6) U.S. Provisional Application No. 62/436,883, entitled "Preventing Account Overdrafts and Excessive Credit Spending," filed on Dec. 20, 2016, each of which is hereby incorporated herein by reference in its entirety.

TECHNICAL FIELD

The present disclosure relates to providing an improved banking experience and, more particularly, to using cognitive computing to automatically handle data transfers and/or to notify a user of potential overdrafts.

BACKGROUND

Online access to financial accounts has become commonplace, with users now enjoying the convenience of paying bills, transferring funds, and checking account balances from the comfort of their own homes. Many people typically have more than one bank account, such as a checking account and a savings account, for example, and may move money between these accounts as needed.

And even though automatic account transfers may be scheduled online so they will occur on specific dates without further user intervention, these transfers tend to be periodic and routine in nature and do not account for unexpected and/or large expenditures. Furthermore, although it is advantageous to leave as little money as possible in accounts that tend to be low interest-bearing accounts, doing so in practice requires a person to monitor his or her account balances in a manner that most people find inconvenient.

BRIEF SUMMARY

In one aspect, a computer-implemented method for notifying a user of a potential overdraft may be provided. The method may include, via one or more local or remote processors, sensors, servers, and/or transceivers: (1) tracking a current account balance for a user's financial account utilizing financial account data; (2) determining when the user is located within a threshold distance of a retailer; (3) calculating a predicted transaction amount that the user is statistically most likely to spend at the retailer; and/or (4) selectively transmitting, by the one or more processors, a notification to a client device associated with the user indicating that a potential overdraft may occur when (i) the predicted transaction amount exceeds the current account balance for the user's financial account, and (ii) the user is located within the threshold distance of the retailer. The method may include additional, less, or alternate actions, including those discussed elsewhere herein.

In another aspect, a computer-implemented method for automatically transferring money between financial accounts may be provided. The method may include, via one or more processors, sensors, servers, and/or transceivers: (1) tracking financial account data including (i) financial transactions associated with a user's first and second financial account, and (ii) a current account balance associated with the user's first and second financial account; (2) calculating an average daily account balance associated with the user's first financial account based upon the financial account data; (3) detecting a surplus when the current account balance associated with the user's first financial account exceeds the average daily account balance by a threshold value; (4) calculating a number of days from when the surplus is detected for which a statistical probability exceeds a threshold likelihood of the balance of the user's first financial account remaining in excess of the average daily account balance; and/or (5) transferring, by the one or more processors, money from the first financial account to the second financial account for the calculated number of days in an amount equal to a difference between the threshold value and the average daily account balance. The method may include additional, less, or alternate actions, including those discussed elsewhere herein.

In yet another aspect, a system for notifying a user of a potential overdraft may be provided. The system may include a client device configured to periodically transmit location data indicative of a current location of the client device and to receive and display notifications associated with a user's financial account, and/or one or more back-end components configured to: (1) track a current account balance for the user's financial account utilizing financial account data; (2) determine when the user is located within a threshold distance of a retailer based upon the periodically transmitted location data; (3) calculate a predicted transaction amount that the user is statistically most likely to spend at the retailer; and/or (4) selectively transmit a notification to the client device associated with the user indicating that a potential overdraft may occur when (i) the predicted transaction amount exceeds the current account balance for the user's financial account, and (ii) the user is located within the threshold distance of the retailer The system may include additional, less, or alternate components, including those discussed elsewhere herein.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

The Figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

The present aspects relate to, inter alia, using cognitive computing and/or predictive modeling to perform various actions when a financial account overdraft is anticipated. To do so, data may be collected and stored by one or more back-end components, which may include a user's financial account balances, the user's demographic data, and/or location data associated with the user's client device. Data may also be collected for other users in a particular region, which may include demographic data and/or the spending habits of the other user's at various retailers. Once a user's proximity to a particular retailer is detected, the one or more back-end components may leverage the user's demographic data and/or that of other users to calculate a predicted transaction amount that the user is statistically most likely to spend at that particular retailer. This predicted transaction amount may then be compared to the user's current account balance to determine whether spending the predicted transaction amount would result in an overdraft. If so, the various actions may include transferring money to cover the anticipated expenditure and/or sending a notification to the client device.

Furthermore, the present aspects discussed herein may relate to, inter alia, using cognitive computing (and/or machine learning) and/or predictive modeling to automatically transfer funds between accounts to optimize accrued interest. To accomplish this, data may be collected by one or more back-end computing devices, which may include a user's financial transactions associated with various financial accounts and/or the balances of those accounts. Using this data, an average daily account balance may be calculated for one or more of the accounts, such as a checking account, for example. A mathematical model may be implemented that identifies funds transfer conditions, such as detecting a surplus of funds when a user's current account balance exceeds an average daily account balance by a threshold value. When a surplus is detected, the one or more back-end components may then calculate a number of days from which a statistical probability exceeds a threshold likelihood of the balance of the user's first financial account maintaining the surplus. The one or more back-end components may transfer money from the first financial account to the second financial account for the calculated number of days in an amount equal to the difference between the threshold value and the average daily account balance.

System Overview

Figure 1:
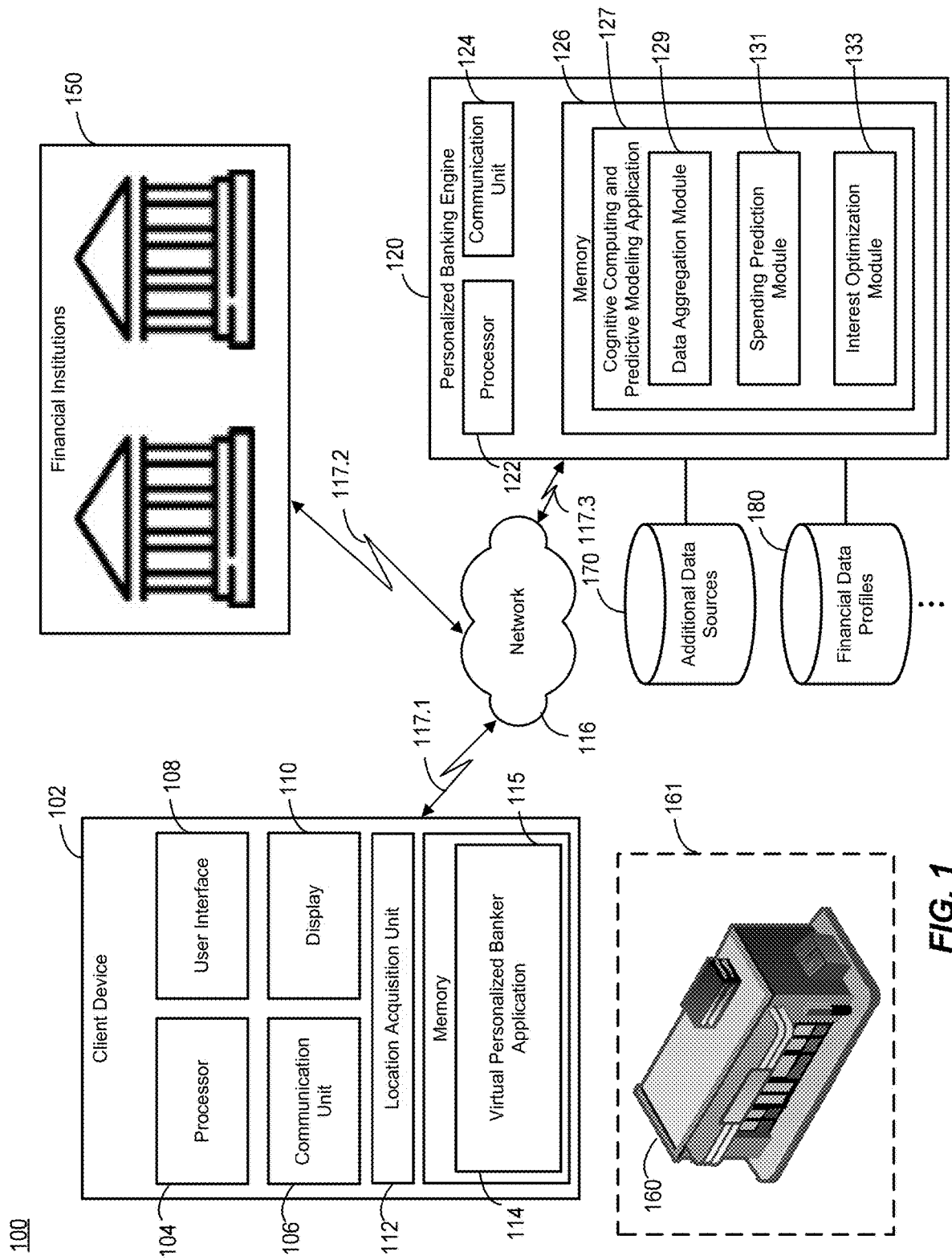
FIG. 1 is a block diagram of an exemplary banking system 100 in accordance with one aspect of the present disclosure.

FIG. 1 is a block diagram of an exemplary banking system 100 in accordance with one aspect of the present disclosure. In the present aspect, banking system 100 may include one or more client devices 102, a personalized banking engine 120, one or more financial institutions 150, one or more retail stores 160, and/or a communication network 116. Banking system 100 may include additional, less, or alternate actions, including those discussed elsewhere herein.

For the sake of brevity, banking system 100 is illustrated as including a single client device 102, a single personalized banking engine 120, two financial institutions 150, a single retail store 160, and a single communication network 116. However, the embodiments described herein may include any suitable number of such components. For example, personalized banking engine 120 may communicate with several client devices 102, each of which being operated by a respective user, to track his or her location and/or receive other types of information, as further discussed herein. To provide another example, personalized banking engine 120 may monitor data received from one or more client devices such that the spending habits of each user may be assessed for several retail stores.

Retail store 160 may be any suitable type of store in which merchandise of any suitable kind is sold. Retail store 160 may encompass physical brick-and-mortar stores as well as virtual stores, such as those accessible via online shopping over the Internet. Although the various aspects described herein reference a physical location, it will be understood that this location may refer to a particular type of location in accordance with the type of retail store that a user is visiting. For example, in the event that retail store 160 is a physical store, personalized banking engine 120 may receive geographic location coordinates from client device 102. To provide another example, in the event that retail store 160 is an online store, personalized banking engine 120 may receive web addresses, Internet Protocol (IP) addresses, etc., to identify the particular retailer's "location" as a unique online retailer.

In the present aspects, retail store 160 may be associated with a boundary 161, which may represent any suitable boundary to appropriately identify a physical location of retail store 160. For example, boundary 161 may represent a geofence including a range of geographic coordinates (e.g., latitude and longitude) such that, when a location of client device 102 crosses boundary 161, client device 102 and/or personalized banking engine 120 may determine that a user associated with client device 102 has also crossed boundary 161, and is therefore proximate to retail store 160.

Communication network 116 may be configured to facilitate communications between one or more client devices 102, one or more financial institutions 150, and/or personalized banking engine 120 using any suitable number of wired and/or wireless links, such as links 117.1-117.3, for example. For example, communication network 116 may include any suitable number of nodes, additional wired and/or wireless networks that may facilitate one or more landline connections, Internet service provider (ISP) backbone connections, satellite links, a public switched telephone network (PSTN), etc.

In the present aspect, communication network 116 may be implemented as a local area network (LAN), a metropolitan area network (MAN), a wide area network (WAN), or any suitable combination of local and/or external network connections. To provide further examples, communications network 106 may include wired telephone and cable hardware, satellite, cellular phone communication networks, base stations, macrocells, femtocells, etc. In the present aspect, communication network 116 may provide one or more client devices 102 with connectivity to network services, such as Internet services, for example, and/or support application programming interface (API) calls between one or more client devices 102, one or more financial institutions 150, and/or personalized banking engine 120.

Client device 102 may be configured to communicate using any suitable number and/or type of communication protocols, such as Wi-Fi, cellular, BLUETOOTH, NFC, RFID, etc. For example, client device 102 may be configured to communicate with communication network 116 using a cellular communication protocol to send data to and/or receive data from one or more financial institutions 150 and/or personalized banking engine 120 via communication network 116 using one or more of radio or radio frequency links 117.1-117.3 or wireless communication channels.

In various aspects, client device 102 may be implemented as any suitable communication device. For example, client device 102 may be implemented as a user equipment (UE) and/or client device, such as a smartphone, for example. To provide additional examples, client device 102 may be implemented as a personal digital assistant (PDA), a desktop computer, a tablet computer, a laptop computer, a wearable electronic device, etc.

As further discussed below, data transmitted by client device 102 to one or more financial institutions 150 and/or personalized banking engine 120 may include, for example, any suitable information used by personalized banking engine 120 to track the location of client device 102, to track account balances of one or more users associated with client device 102, to anticipate an overdraft of one or more financial accounts associated with one or more financial institutions 150, to calculate if and when to instruct one or more financial institutions 150 to transfer money between a user's various financial accounts and how much money to transfer, etc.

Furthermore, data received by client device 102 from one or more financial institutions 150 and/or personalized banking engine 120 may include any suitable information used to notify the user of a suggested course of action and/or that an automated course of action has been taken regarding the user's financial accounts. For example, if an anticipated overdraft of one or more accounts is detected, then client device 102 may display a notification transmitted via personalized banking engine 120 of the account's current balance, a calculated transaction amount that is predicted to be spent at retailer 160, a calculated overdraft amount, etc. To provide another example, in the event that a surplus of funds is detected in one or more of the user's financial accounts at one or more financial institutions 150, the user may receive an indication that a transfer is pending, a transfer has been made, the details of the transfer such as how long until funds are transferred back and/or the amount of the transfer, etc.

Personalized banking engine 120 may be configured to communicate using any suitable number and/or type of communication protocols, such as Wi-Fi, cellular, BLUETOOTH, NFC, RFID, etc. For example, personalized banking engine 120 may be configured to communicate with client device 102 using a cellular communication protocol to send data to and/or receive data from client device 102 via communication network 116 using wireless communication or data transmission over one or more of radio links 117.1-117.3 (or other wireless communication channels). For example, as further discussed herein, personalized banking engine 120 may receive location data from client device 102 indicative of a current geographic location of client device 102 (e.g., geographic coordinates), a retail website address that client device 102 is currently navigating, demographic information associated with client device 102, etc. To provide another example, personalized banking engine 120 may transmit notifications, messages, etc., to client device 102, which may in turn be displayed via client device 102.

To provide yet another example, personalized banking engine 120 may be configured to communicate with one or more financial institutions 150 to send data to, and/or receive data from, one or more financial institutions 150. For example, a user may set up account permissions to authorize personalized banking engine 150 to access financial data from one or more user accounts held at one or more financial institutions and/or to make withdrawals, deposits, and transfers on the user's behalf. Once such authorizations are set up, personalized banking engine 120 may be configured to actively request funds transfers to one or more financial institutions 150, and/or to track and/or manage funds held in one or more user accounts at one or more financial institutions 150.

Detailed Operation of Banking System

In the present aspect, client device 102 may include one or more processors 104, a communication unit 106, a user interface 108, a display 110, a location acquisition unit 112, and a memory unit 114.

Communication unit 106 may be configured to facilitate data communications between client device 102 and one or more of communication network 116, financial institutions 150, and/or personalized banking engine 120 in accordance with any suitable number and/or type of communication protocols. Communication unit 106 may be configured to facilitate data communications based upon the particular component and/or network with which client device 102 is communicating.

Such communications may facilitate the transmission of location data and/or other data from client device 102 that is utilized by personalized banking engine 120 to provide enhanced banking or other financial services for a user associated with client device 102, as further discussed herein. In the present aspects, communication unit 106 may be implemented with any suitable combination of hardware and/or software to facilitate this functionality. For example, communication unit 106 may be implemented with any suitable number of wired and/or wireless transceivers, network interfaces, physical layers (PHY), ports, antennas, etc.

User interface 108 may be configured to facilitate user interaction with client device 102. For example, user interface 108 may include a user-input device such as an interactive portion of display 110 (e.g., a "soft" keyboard displayed on display 110), an external hardware keyboard configured to communicate with client device 102 via a wired or a wireless connection (e.g., a BLUETOOTH keyboard), an external mouse, or any other suitable user-input device.

Display 110 may be implemented as any suitable type of display that may facilitate user interaction, such as a capacitive touch screen display, a resistive touch screen display, etc. In various aspects, display 110 may be configured to work in conjunction with user-interface 108 and/or one or more processors 104 to detect user inputs upon a user selecting a displayed interactive icon or other graphic, to identify user selections of objects displayed via display 110, to display notifications of suggested actions to take and/or actions that have already been taken regarding a user's financial accounts at one or more financial institutions 150, etc.

Location acquisition unit 112 may be implemented as any suitable device configured to generate location data indicative of a current geographic location of client device 102. In one aspect, location acquisition unit 102 may be implemented as a satellite navigation receiver that works with a global navigation satellite system (GNSS), such as the global positioning system (GPS) primarily used in the United States, the GLONASS system primarily used in the Soviet Union, the BeiDou system primarily used in China, and/or the Galileo system primarily used in Europe.

Location acquisition unit 112 and/or one or more processors 104 may be configured to receive navigational signals from one or more satellites and to calculate a geographic location of client device 102 using these signals. Location acquisition unit 112 may include one or more processors, controllers, or other computing devices and memory to calculate the geographic location of client device 102 without one or more processors 104. Alternatively, location acquisition unit 112 may utilize components of one or more processors 104. Thus, one or more processors 104 and location acquisition unit 112 may be combined or be separate or otherwise discrete elements.

One or more processors 104 may be implemented as any suitable type and/or number of processors, such as a host processor for the relevant device in which client device 102 is implemented, for example. One or more processors 104 may be configured to communicate with one or more of communication unit 106, user interface 108, display 110, location acquisition unit 112, and/or memory unit 114 to send data to and/or to receive data from one or more of these components.

For example, one or more processors 104 may be configured to communicate with memory unit 114 to store data to and/or to read data from memory unit 114. In accordance with various embodiments, memory unit 114 may be a computer-readable non-transitory storage device, and may include any combination of volatile memory (e.g., a random access memory (RAM)) and/or non-volatile memory (e.g., battery-backed RAM, FLASH, etc.). In one embodiment, memory unit 114 may be configured to store instructions executable by one or more processors 104. These instructions may include machine-readable instructions that, when executed by one or more processors 104, cause one or more processors 104 to perform various acts.

In one aspect, virtual personalized banker application 115 is a portion of memory unit 114 configured to store instructions, that when executed by one or more processors 104, cause one or more processors 104 to perform various acts in accordance with applicable embodiments as described herein. For example, instructions stored in virtual personalized banker application 115 may facilitate one or more processors 104 performing functions such as determining when client device 102 has crossed boundary 161 or is otherwise proximate to retail store 160, periodically transmitting the location of client device 102 (or causing location acquisition unit 112 to do so) as part of a running background process, sending information to one or more financial institutions 150 and/or personalized banking engine 120, receiving information from one or more financial institutions 150 and/or personalized banking engine 120, displaying notifications and/or other information using data received via one or more financial institutions 150 and/or personalized banking engine 120, etc.

In some aspects, virtual personalized banker application 115 may reside in memory unit 114 as a default application bundle that may be included as part of the operating system (OS) utilized by client device 102. But in other aspects, virtual personalized banker application 115 may be installed on client device 102 as one or more downloads, such as an executable package installation file downloaded from a suitable application store via a connection to the Internet.

For example, virtual personalized banker application 115 may be stored in any suitable portions of memory unit 114 upon installation of a package file downloaded in such a manner. Examples of package download files may include downloads via the iTunes Store, the Google Play Store, the Windows Phone Store, a package installation file downloaded from another computing device, etc. Once downloaded, virtual personalized banker application 115 may be installed on client device 102 as part of an installation package. Upon installation of virtual personalized banker application 115, memory unit 114 may store executable instructions that, when executed by one or more processors 104, cause client device 102 to implement the various functions of the aspects as described herein.

For example, upon installing and launching virtual personalized banker application 115 on client device 102, a user may be prompted to enter login information and/or complete an initial registration process to create a user profile with a party associated or otherwise affiliated with personalized banking engine 120, which may be the same party or a different party than that affiliated with one or more financial institutions 150, as further discussed below. The user may initially create a user profile upon first launching the application, through a registration process via a website, over the phone, etc. This user profile may include, for example, the customer's demographic information or any suitable information that may be useful in facilitating various portions of the aspects as described herein.

This registration process may additionally or alternatively include, for example, obtaining the user's affirmative consent or permission to track his or her location, to track and/or receive the user's financial account data including financial transactions and/or account balances associated with the user's financial accounts at one or more financial institutions 150, to opt-in to a system whereby the user's spending habits are tracked and/or spending data at various retailers is collected, to provide authorization (e.g., online login credentials) to access the user's accounts held at one or more financial institutions 150, etc.

In the present aspects, virtual personalized banker application 115 may provide different levels of functionality based upon options selected by a user and/or different implementations of virtual personalized banker application 115. For example, in some aspects, virtual personalized banker application 115 may facilitate client device 102 working in conjunction with one or more financial institutions 150 and/or personalized banking engine 120 to predict account overdrafts and perform various actions accordingly. To provide another example, other aspects include virtual personalized banker application 115 facilitating client device 102 working in conjunction with one or more financial institutions 150 and/or personalized banking engine 120 to transfer funds between various financial accounts held at one or more financial institutions 150 to optimize interest accrual. To provide yet another example, other aspects may include virtual personalized banker application 115 facilitating both of the aforementioned functionalities and/or other functionalities as further discussed herein.

One or more financial institutions 150 may include any suitable number and/or type of financial institutions that hold and/or are associated with various financial accounts. For example, one or more financial institutions 150 may include banks, creditors, and/or brokers. One or more users (e.g., a user associated with client device 102) may hold one or more accounts with the various institutions such as checking accounts, savings accounts, credit accounts, charge accounts, money market accounts, brokerage accounts, etc. These accounts may be held at a single institution or spread out across several different financial institutions.

In one aspect, financial accounts held at one or more financial institutions 150 may be accessible via a secure connection to communication network 116, for example, by client device 102 and/or personalized banking engine 120. For example, one or more financial institutions 150 may provide online banking services that allow a user to access his accounts using client device 102 and/or another suitable computing device. Upon receipt of a valid authenticated request for financial data, one or more financial institutions 150 may transmit financial data to client device 102 and/or personalized banking engine 120, which is further discussed below. Examples of the financial data transmitted by one or more financial institutions 150 may include financial transaction data indicating previous credits and debits to a user's accounts, a current account balance, spending data such as the time, amount, and specific merchant for which previous account debits and/or charges were made, etc.

Personalized banking engine 120 may include any suitable number of components configured to receive data from and/or send data to one or more of client devices 102 and/or one or more financial institutions 150 via communication network 116 using any suitable number of wired and/or wireless links. In various embodiments, personalized banking engine 120 may constitute a portion of (or the entirety of) one or more back-end components, and may be configured (alone or in conjunction with other back-end components) to execute one or more applications to perform one or more functions associated with the various aspects as discussed herein.

For example, as shown in FIG. 1, personalized banking engine 120 may communicate with one or more external computing devices, such as servers, databases, database servers, web servers, etc. The present aspects include personalized banking engine 120 working in conjunction with any suitable number and/or type of back-end components to facilitate the appropriate functions of the aspects as described herein.

For example, personalized banking engine 120 may be implemented as any suitable number of servers that are configured to access data from one or more additional data sources and/or store data to one or more storage devices. For example, as shown in FIG. 1, additional data sources 170 may represent data that is made available to personalized banking engine 120, such as third-party data providers or other data sources in addition to and including one or more financial institutions 150. This additional data may facilitate the execution of one or more cognitive computing and/or predictive modeling algorithms via personalized banking engine 120 to calculate the statistical probability that an overdraft is about to occur, whether a particular user account has a surplus in funds, if and when to transfer some of an account surplus to another account with a better interest rate, the amount of such transfers, etc.

To provide some illustrative examples, additional data sources 170 may include data mined from social media and/or a user's web browsing habits, data provided by various retailers, demographic data associated with other users in a particular region and/or associated with a particular retailer, income levels of various users, where different users commonly shop, assets associated with various users (such as the cars each user owns, etc.), mortgage loan information associated with various users, how much users typically spend at various retailers, etc. Any portion of this data may be used as input to one or more cognitive computing and/or predictive modeling algorithms to perform such calculations, some examples of which are further discussed below.

To provide another example, personalized banking engine 120 may be implemented as any suitable number of servers that are configured to generate and/or store financial data profiles 180. Financial data profiles 180 may include, for example, an aggregation of spending data, financial data, demographic data, etc., correlated to one or more users and accessed via personalized banking engine 120 data. This data may include the aforementioned data received via one or more financial institutions 150 and/or other data including additional data sources 170, for example.

To provide an illustrative example, financial data profiles 180 may include a number of user profiles organized in accordance with suitable types of information to uniquely identify each particular user, so that each user may later be matched to his or her financial data profile stored in financial data profiles 180. For example, financial data profiles 180 may store a username that is used by one or more users in accordance with virtual personalized banker application 115, a first and last name of each user, etc. These financial data profiles are discussed in further detail below.

In the present aspect, personalized banking engine 120 may include one or more processors 122, a communication unit 124, and/or a memory unit 126. One or more processors 122, communication unit 124, and memory unit 126 may be substantially similar implementations of, and perform substantially similar functions as, one or more processors 104, communication unit 106, and memory unit 114, respectively, of client device 102. Therefore, only the differences between these components will be further discussed herein.

Of course, differences between components of personalized banking engine 120 and client device 102 may be owed to differences in device implementation rather than the functions performed by each individual component. For example, if personalized banking engine 120 is implemented as a server whereas client device 102 is implemented as a personal computing device, one or more processors 122 may have more processing power (e.g., a faster processor, more cores, etc.) than one or more processors 104, although one or more processors 122 may perform similar functions as one or more processors 104 (e.g., executing instructions stored in memory to perform various acts, processing data, etc.).

Again, in various aspects, personalized banking engine 120 may acquire data from various sources. Some of these sources may include data from secure connections or may otherwise require secured or authorized access. For example, one or more financial institutions 150 may provide access to one or more users' financial account data via any suitable authentication technique, such as via a secure connection, password authentication, public and/or private key exchanges, biometric identification, etc.

In the present aspects, personalized banking engine 120 may, when appropriate, implement any suitable techniques to obtain information in a legal and technically feasible manner. For example, a user may setup an account and/or profile with a third party associated with personalized banking engine 120. The user may then opt in to data collection via the various data sources that are to be collected via personalized banking engine 120, such as browsing habits, social media, etc. The user may additionally or alternatively provide authentication information for each account and/or data source for which data is to be accessed, collected, tracked, monitored, etc.

Cognitive Computing

Cognitive computing may refer to systems that learn at scale, reason with purpose, and/or interact with humans naturally. Rather than being explicitly programmed, cognitive computing systems may learn and reason from their interactions and from their experiences with their environment. As opposed to traditional computing systems, which are deterministic, cognitive computing systems are probabilistic. In other words, cognitive computing systems generate not just answers to numerical problems, but hypotheses, reasoned arguments, and recommendations about more complex and meaningful bodies of data. Cognitive computing systems may advantageously interpret and utilize data that is typically referred to as being unstructured in nature. This allows such systems to keep pace with the volume, complexity, and unpredictability of information and systems in the modern world. To do so, cognitive computing systems attempt to augment the reasoning and thought processes of the human brain.

Therefore, in various aspects, personalized banking engine 120 may be implemented as a computing device, or a constituent part of one or more computing devices, that is/are configured to process data in accordance with one or more cognitive computing techniques and/or machine learning techniques. For example, personalized banking engine 120 may be implemented as one or more nets or nodes of an artificial neural network system and/or other suitable system that models and/or mimics the reasoning and processing of the human brain. Thus, cognitive computing and predictive modeling application 127 may include one or more machine learning algorithms, pattern recognition techniques, code, logic, and/or instructions to facilitate the behavior, functionality, and/or processing of a cognitive computing system.

In certain embodiments, personalized banking engine 120 may utilize machine learning techniques. The machine learning techniques may be cognitive learning, deep learning, combined learning, heuristic engines and algorithms, and/or pattern recognition techniques. For instance, a processor (such as the processor 104 of client device 102, or the processor 122 of the personalized banking engine 120) or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, client device, insurer database, and/or third-party database data, including data from a user's financial data profile 180. For example, the data from a user's financial data profile 180 may be provided by a service provider the user has an agreement with such as one of the financial institutions 150. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more client device details, user request or login details, user device sensors, geolocation information, image data, an insurer database, a third-party database, and/or other data.

In one embodiment, a processing element (and/or machine learning or heuristic engine or algorithm discussed herein) may be trained by providing it with a large sample of financial data with known characteristics or features, such as historical financial data profiles. Based upon these analyses, the processing element may learn how to identify characteristics and patterns that may then be applied to analyzing data relevant to the operation of the personalized banking engine 120, device sensors, geolocation information, image data, an insurer database, a third-party database, and/or other data. For example, the processing element may learn, with the user's permission or affirmative consent, to identify a user's spending habits, or spending habits for a population of users, and provide to the personalized banking engine 120 any learned insights.

In the present aspects, cognitive computing and predictive modeling application 127 may include any suitable combination of functions as discussed herein. For example, as shown in FIG. 1, cognitive computing and predictive modeling application 127 includes a data aggregation module 129, a spending prediction module 131, and an interest optimization module 133. These modules are for illustrative purposes, and represent some of the example functionality that may be performed by personalized banking engine 120 in accordance with a cognitive computing-based system. However, some aspects include cognitive computing and predictive modeling application 127, including additional, less, or alternate actions, such as those discussed elsewhere herein. Furthermore, some aspects include cognitive computing and predictive modeling application 127 implementing traditional, non-cognitive computing processes.

In one aspect, data aggregation module 129 is a portion of memory unit 126 configured to store instructions, that when executed by one or more processors 122, cause one or more processors 122 to perform various acts in accordance with applicable embodiments as described herein. In the present aspects, instructions stored in data aggregation module 129 may facilitate one or more processors 122 performing functions such as mining data for any suitable number of users. For example, instructions stored in data aggregation module 129 may facilitate personalized banking engine 120 providing the requested authorization to one or more financial institutions 150 to receive financial data from these institutions, such as a user's current and/or past account balances, financial transactions that impact the user's account balances, etc. To provide another example, instructions stored in data aggregation module 129 may facilitate personalized banking engine 120 accessing one or more additional data sources (e.g., via database 170) to receive data from one or more third party data mining providers, to receive browsing history data associated with one or more users, to receive demographic data and/or household income data for one or more users, etc.

To provide yet another example, instructions stored in data aggregation module 129 may facilitate personalized banking engine 120 receiving spending data from one or more financial institutions 150 (e.g., a credit card company) and/or participating retailers (e.g., retailer 160, online retailers, etc.), where the spending data may indicate how much money one or more users spent at various retailers, where each retailer was located, and/or what was purchased. The spending data may come from any suitable source in addition to, or as an alternative to, one or more financial institutions 150 and/or participating retailers. For example, the spending data may be received from client device 102 when a user uses client device 102 to make purchases (e.g., via a mobile device payment).

In the present aspects, instructions stored in data aggregation module 129 may facilitate personalized banking engine 120 to aggregate received data and to organize this data into one or more financial profiles. These financial profiles may be associated with each user for which data is received, and organized such that data contained as part of each profile may be associated with each unique user. For example, each user's username and/or other suitable identifying information may be stored as part of a financial profile that includes an aggregation of all data received for that particular user from one or more data sources, as previously discussed. The details of the financial profiles are further discussed herein with reference to FIG. 2.

In one aspect, spending prediction module 131 is a portion of memory unit 126 configured to store instructions that, when executed by one or more processors 122, cause one or more processors 122 to perform various acts in accordance with applicable aspects as described herein. In the present aspects, instructions stored in spending prediction module 131 may facilitate one or more processors 122 performing functions such as calculating a statistical likelihood that a user will spend money at a particular retailer in an amount that may result in an account overdraft. To do so, aspects include personalized banking engine 120 accessing and/or receiving one or more inputs, weighting these inputs as part of a weighting function, and calculating, as an output of the weighting function, a statistical likelihood that the user will spend a certain amount of money resulting in an overdraft. The details of these calculations are further discussed below.

For example, instructions stored in spending prediction module 131 may facilitate one or more processors 122 tracking a current account balance for a user's financial account utilizing financial account data that is received via one or more financial institutions 150 and/or stored as part of the user's profile in financial data profiles 180. Furthermore, personalized banking engine 120 may determine the location of client device 102 and/or one or more websites visited by a user via client device 102 to attempt to anticipate whether a user is about to spend money that would result in a reduction of funds.

For example, personalized banking engine 120 may periodically compare location data received via client device 102 to determine whether client device 102 (and thus a user associated with client device 102) is within a threshold distance or otherwise proximate to a particular retailer (e.g., client device 102 has crossed a geofence associated with boundary 161 and therefore proximate to retailer 160). If so, personalized banking engine 120 may use this as a trigger condition to begin calculating a statistical likelihood of what amount, if any, the user is likely to spend at that retailer.

To provide another example, personalized banking engine 120 may periodically compare IP addresses and/or websites received via client device 102 to determine whether client device 102 (and thus a user associated with client device 102) is currently visiting a particular online retailer. This may be determined, for example, by accessing database 170, which may contain a list of known online retailers and their associated IP addresses or other uniquely identifiable information. If so, personalized banking engine 120 may use this as a trigger condition to begin calculating a statistical likelihood of what amount, if any, the user is likely to spend at that online retailer.

Furthermore, personalized banking engine 120 may not only calculate a predicted transaction amount, but the most likely account that the user will use to do so. Because personalized banking engine 120 may have access to the user's financial account data, such as current balances of checking accounts and/or credit card accounts, some aspects may include instructions stored in spending prediction module 131 that facilitate personalized banking engine 120 determining whether this amount, if actually spent, would result in one or more negative financial outcomes for the user.

To provide an illustrative example, a statistical likelihood may be calculated that exceeds a threshold likelihood (e.g., 75%) that the user will spend a particular amount of money at the retailer, drawing funds from his checking account to do so. In this scenario, personalized banking engine 120 may calculate the effect of such a potential transaction on the user's current checking account balance. In the event that a potential transaction of the calculated predicted spending amount would cause an overdraft, then personalized banking engine 120 may transmit a notification to client device 102 indicating that a potential overdraft may occur.

To provide another illustrative example, personalized banking engine 120 may calculate the effect of a potential transaction on the user's credit card balance. In the event that a potential transaction of the calculated predicted spending amount would cause the user's credit card balance to exceed a maximum limit, then personalized banking engine 120 may transmit a notification to client device 102 indicating this.

In various aspects, spending prediction module 131 may facilitate one or more processors 122 performing active and/or passive techniques to attempt to rectify one or more potential negative financial outcomes for the user. For example, the aforementioned notifications may act as passive techniques to inform the user, via client device 102, that a potential overdraft may occur, that a maximum credit card limit may be exceeded, etc. These notification techniques may include, for example, pushing a notification to client device 102, sending an email message to client device 102, sending a text message notification to client device 102, and/or any other suitable technique(s).

Additionally or alternatively, spending prediction module 131 may facilitate one or more processors 122 actively avoiding one or more potential negative financial outcomes for the user. For example, in the event that a potential credit card overdraft is detected, personalized banking engine 120 may communicate with one or more financial institutions 150 to request a funds transfer from one of the user's other financial accounts to cover the calculated predicted transaction amount. For example, personalized banking engine 120 may request a transfer of user funds from a savings account to a checking account in an amount equal to the calculated predicted transaction amount (or within a threshold, e.g., 10% greater than the calculated predicted transaction amount). In this way, personalized banking engine 120 may actively monitor user activity and behavior and attempt to predict and rectify potential issues before they actually occur.

In one aspect, interest optimization module 133 is a portion of memory unit 126 configured to store instructions, that when executed by one or more processors 122, cause one or more processors 122 to perform various acts in accordance with applicable aspects as described herein. In the present aspects, instructions stored in interest optimization module 133 may facilitate one or more processors 122 performing functions such as attempting to optimize accrued interest among several of a user's financial accounts. For example, personalized banking engine 120 may request a transfer of funds between a user's financial accounts when a surplus of funds is detected in a lower interest-bearing account.

The details of the calculations that are performed to determine when funds should be transferred, the amount, and for how long, are further discussed below with reference to FIG. 3. As a general example, however, the present aspects include instructions stored in interest optimization module 133 facilitating one or more processors 122 calculating an average daily account balance associated with one of a user's financial accounts. This data may be accessed, for example, from the financial account data that is associated with the user's financial data profile and/or received via communications with one or more financial institutions 150. Based upon the previous account activity, such as deposit frequencies and previous day-to-day account balances, an average daily account balance may be calculated for one or more user accounts.

In the present aspects, a surplus of funds may be detected when a current account balance exceeds the calculated average daily account balance by a threshold value (e.g., by 10%, 25%, 50%, etc.). Once a surplus is detected, one or more processors 122 may calculate a number of days from the time the surplus is detected for which a statistical probability exceeds a threshold likelihood of the balance of the user's financial account remaining in excess of the average daily account balance. In other words, a likelihood may be calculated that the surplus may remain for some period of time in excess of the average daily account balance. If this likelihood exceeds a threshold likelihood (e.g., 80%), then one or more processors 122 may request a transfer of funds from the financial account with the surplus to another, higher interest-bearing financial account for the calculated number of days in an amount equal to a difference between the threshold value and the average daily account balance. In this way, personalized banking engine 120 may actively monitor user account activity and attempt to optimize accrued interest by automatically moving funds between accounts when a surplus of funds held in a low interest-bearing fund is identified.

As discussed above with reference to spending prediction module 131, interest optimization module 133 may also cause personalized banking engine 120 to transmit appropriate notifications (e.g., emails, text messages, push notifications, etc.) to client device 102. These notifications may, for example, indicate that a transfer has occurred or is about to occur, thereby keeping the user up-to-date on the account activity and/or allowing the user to intervene if the account transfer is unwanted or unneeded.

Exemplary User Financial Data for Cognitive Computing Calculations

Figure 2:
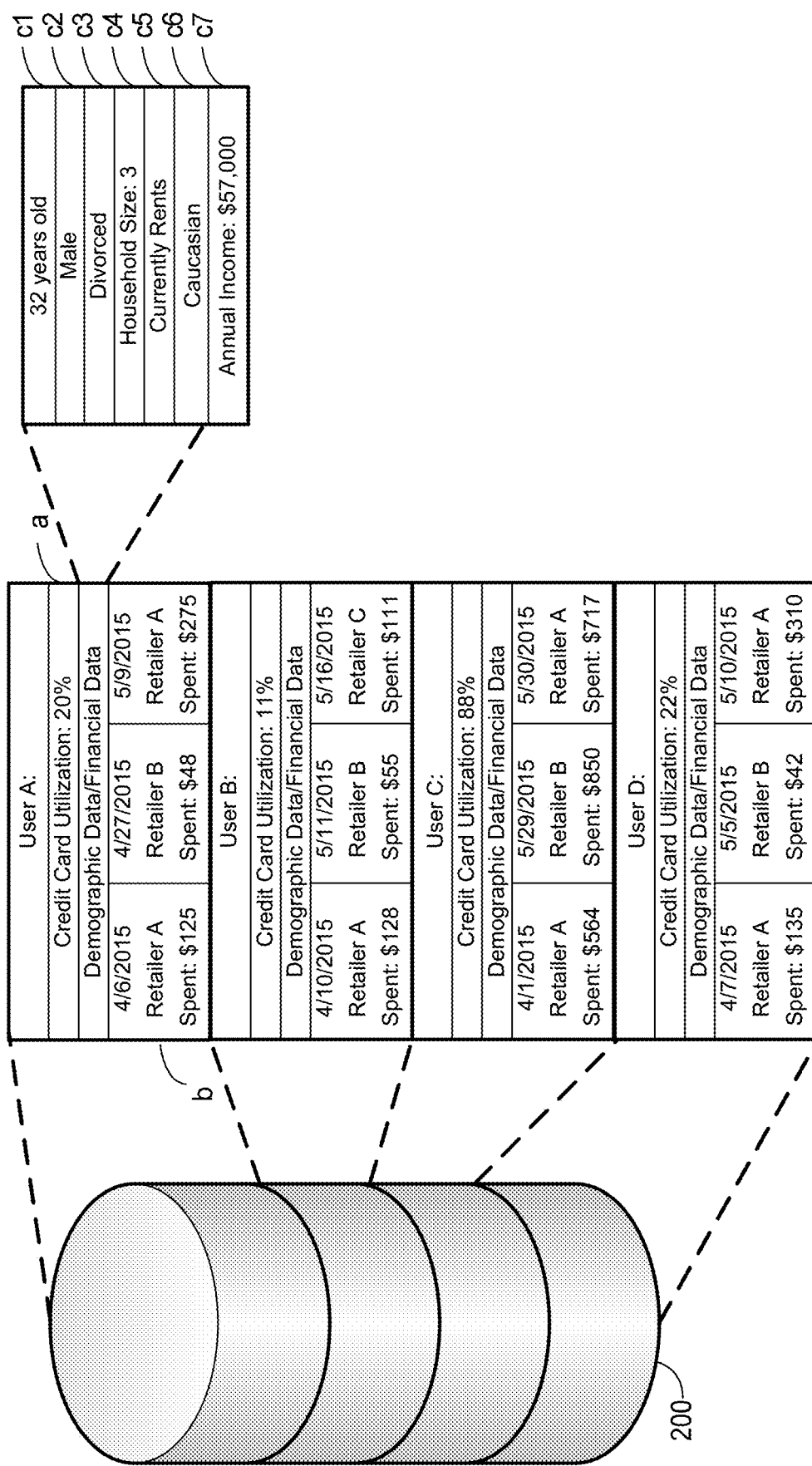
FIG. 2 illustrates exemplary financial data profiles 200 in accordance with one aspect of the present disclosure.

FIG. 2 illustrates exemplary financial data profiles 200 in accordance with an aspect of the present disclosure. As shown in FIG. 2, financial data profiles 200 are an example of the various types of data that may be stored in any suitable number of storage units or databases (e.g., financial data profiles 180, as shown in FIG. 1) and organized, modified, and/or accessed via a personalized banking engine, such as personalized banking engine 120, for example, as shown in FIG. 1.

As shown in FIG. 2, financial data profiles 200 include a number of financial data profiles associated with a number of individual users A-D. Although only four example financial data profiles are illustrated in FIG. 2, aspects include financial data profiles 200 including any suitable number of financial data profiles for any suitable number of different users.

Financial data profiles 200 illustrate a number of different types of data associated with each user. Again, this data may be used in accordance with the present aspects to perform calculations and predictions regarding a user's financial accounts. FIG. 2 illustrates each of financial data profiles 200 as having a specific number and amount of data associated with each user's financial data profile; however, aspects include financial data profiles 200 storing any suitable number and/or type of data to facilitate the calculations and/or predictions as discussed herein.

For example, as shown in FIG. 2, each user's financial data profile contains three different types of inputs. Input (a) may represent each user's credit card utilization as a percentage of each user's maximum credit card limits. Credit card utilization may be obtained, for example, via data received from third party credit reports and/or data obtained via access to a user's credit card accounts. Input (b) may represent a history of retailers that each user may have visited over some period of time (e.g., within the last 30 days, 60 days, etc.), the amount of money that each user spent at each retailer, and/or what each user purchased, while inputs (c1-c7) may represent a number of demographic factors.

In addition to the aforementioned inputs (a), (b), and (c1-c7), each user's financial data profile may contain other information such as financial account data. The details of each user's financial data are not shown in FIG. 2 for purposes of brevity, but may include any suitable data used to calculate a daily account balance, an average account balance over some period of time, spending data discussed above, etc. In other words, each user's financial data profile may include all necessary information required to perform the aspects described herein.

In the present aspects, upon detecting a user's proximity to a physical retailer or a user navigating an online retailer's website, personalized banking engine 120 may utilize data stored in one or more financial data profiles to calculate a predicted transaction amount that the user is statistically most likely to spend at that particular retailer. Aspects include personalized banking engine 120 utilizing this data in accordance with any suitable predictive modeling and/or cognitive computing techniques to calculate a predicted transaction amount.

For example, personalized banking engine 120 may calculate the predicted transaction amount as an output of a weighting function that weights a plurality of inputs extracted from any combination of data stored in one or more financial data profiles. The weighting function may, for example, place weights upon various inputs that tend to contribute or correlate more to the determination of how much a certain user typically spends at a particular retailer.

This may be analyzed, for example, in light of previous data stored in the user's financial data profile and/or a history of data stored in other user's financial profiles. To provide an illustrative example, an analysis of data stored across one or more financial data profiles may indicate a strong correlation between an amount of money spent at certain retailers and certain elements of demographic data, such as age (c1) and income (c7). Furthermore, such an analysis may also indicate a weaker correlation between an amount of money spent at certain retailers and credit card utilization and other elements of demographic data, such as gender (c2) and household size (c4).

Continuing the previous example, aspects include calculating a predicted transaction amount by applying greater weight to inputs from financial data profiles having a stronger correlation to the amount spent at a particular retailer, and applying lesser weight to inputs from financial data profiles having a weaker correlation to the amount spent at a particular retailer. In this way, personalized banking engine 120 may determine the statistically most likely transaction amount that a user will spend at a particular retailer based upon that user's previous behavior and/or similar user's previous behavior at the same retailer or similar retailers (e.g., retailers selling similar merchandise, located in a similar region, etc.).

To provide another illustrative example, each of financial data profiles 200 may store spending data (e.g., as part of the financial data) that indicates an average amount spent by each of the plurality of users at various retailers over a period of time. Continuing this example, personalized banking engine 120 may determine the statistically most likely transaction amount that a user will spend at a particular retailer by identifying a subset of the users that have demographic information that best matches that of the user. With reference to FIG. 2, for example, assume that users A, B, and D have similar demographic data inputs (e.g., a threshold number of inputs c1-c7 match or match within a certain threshold).

Further assume that personalized banking engine 120 has detected that user A is nearby retailer A. In such a scenario, the present aspects may include personalized banking engine 120 calculating a predicted transaction amount for user A at retailer A by averaging the amount spent by each of users B and D over the last 60 days at the same retailer (a total of three transactions), which results in a calculation of ($128+$135+$310)/3=$191. If an adequate amount of data exists for user A's previous visits to the same retailer, this data may also be included in the average calculation. For example, user A may have purchased two $200 items at retailer A over the last 60 days. As such, there would be five transactions of $128, $135, $200, $200, and $310. In this case, the average amount spent by users A, B, and D at retailer A would be $194.60. In another embodiment, personalized banking engine 120 may calculate a predicted transaction amount for user A at retailer A by determining the median amount spent by each of users A, B, and D over the last 60 days at retailer A, which results in the following calculation: median ($128, $135, $200, $200, $310)=$200. Of course, various modifications may be made to such calculations, such as not including certain data points outside a certain range to prevent skewing of calculations, weighing the user's own spending data more heavily than other user's, etc.

To provide yet another illustrative example, aspects include personalized banking engine 120 determining the statistically most likely transaction amount that a user will spend at a particular retailer by combining spending data with a weighing function. In other words, as in the previous example, personalized banking engine 120 may identify a subset of the users that have demographic information that best matches that of a user for which the calculation is being performed.

However, instead of averaging the spending amounts among the identified users for the same retailer, aspects include personalized banking engine 120 calculating dominant portions of the demographic information that cause the greatest variance in the average amount spent by each of the subset of the plurality of other users. Therefore, these dominant portions may constitute demographic factors with the strongest correlation to the average amount spent across multiple users.

For example, assume that all users A-D have similar demographic data. User's A, B, and D are shown to have recently spent similar amounts at the same retailer A, while user C is shown to have spent significantly more. An analysis of the differences between their demographic data may indicate, however, that although several portions of demographic data match among users A-D, user C has an annual income approximately twice that of user's A, B, and D. Therefore, annual income input (c7) may be considered the dominant portion of demographic data in this example. Thus, the statistically most likely transaction amount may be calculated by weighting this input (c7) differently than the others, such as by increasing its weight compared to the other demographic inputs (c1-c6), for example.

Figure 3:
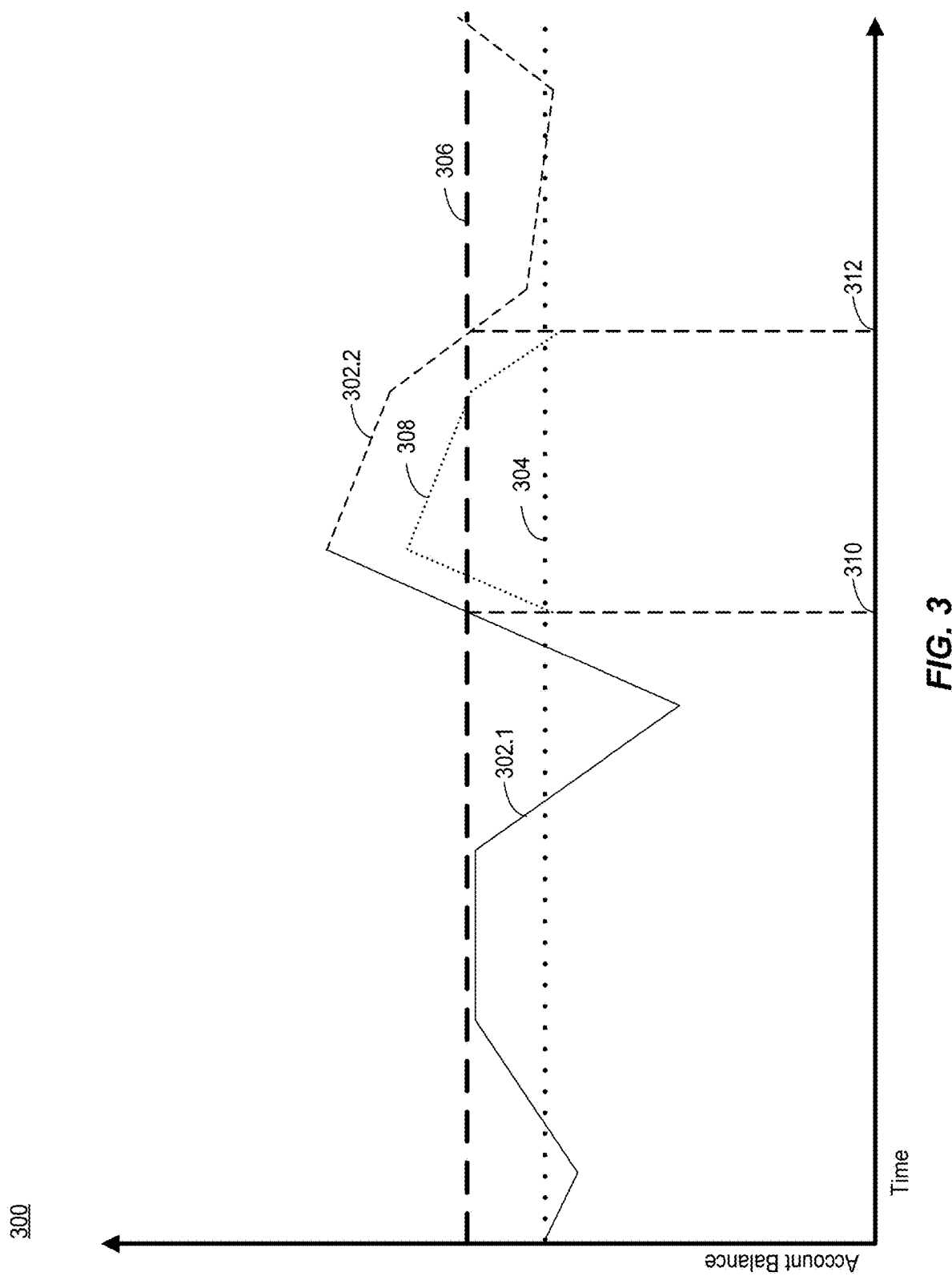
FIG. 3 illustrates a graphical representation of an exemplary tracked financial account balance 300 in accordance with one aspect of the present disclosure.

Exemplary Financial Account Balance Tracking for Cognitive Computing Calculations FIG. 3 illustrates a graphical representation of an exemplary tracked financial account balance 300 in accordance with an aspect of the present disclosure. In the present aspect, tracked financial account balance 300 may represent data in a time-wise format that is monitored by a personalized banking engine, such as personalized banking engine 120, for example, as shown in FIG. 1.

For example, tracked financial account balance 300 may constitute an account balance of one or more user accounts that is accessed, monitored, or otherwise tracked, which may be stored as part of financial data profiles 180, as shown in FIG. 1. Thus, the data used to construct the tracked financial account balance 300 may be part of a user's financial profile. In various aspects, the user's financial data, including the account balances, may be updated in accordance with any suitable schedule (e.g., once per day, once every hour, once every 30 minutes, etc.). Therefore, tracked financial account balance 300 may represent a log of historical daily closing balances for a user's financial account, such as a checking account, for example.

As shown in FIG. 3, financial account balance 300 shows variations of a user's account balance over a period of time as line 302.1. In accordance with the present aspects, personalized banking engine 120 may average variations in a user's account balance over any suitable time window, such as the previous 30 days, the previous 60 days, etc., to calculate an average daily account balance 304 within this window. Furthermore, personalized banking engine 120 may calculate average daily account balance 304 as a rolling average, updating the value each day as the window moves forward in time, such that average daily account balance 304 represents an average account balance from the most recent 30 days, the most recent 60 days, etc.

Although referred to as an average daily account balance, average daily account balance 304 may be calculated using any suitable techniques including traditional, or "straight" averaging or weighted averaging, such as giving more weight to monetary amounts that are more common or appear more often within a time period. Furthermore, the present aspects include personalized banking engine 120 calculating average daily account balance 304 by truncating or not including more sporadic changes in the account balance within a time period.

In still other aspects, personalized banking engine 120 may calculate average daily account balance 304 via one or more cognitive computing techniques and/or predictive modeling techniques. Personalized banking engine 120 may attempt, for example, to predict average daily account balance 304 based upon spending history, financial transactions associated with the user's accounts, the frequency and/or amount of deposits to the user's financial account (e.g., regular recurring deposits from the user's paycheck or direct deposit), etc.

Thus, personalized banking engine 120 may track or otherwise calculate average daily account balance 304 using any suitable number and/or sources of data, such as third party data sources and/or one or more financial account data received or otherwise accessed via the user's one or more financial institutions (e.g., one or more financial institutions 150, as shown in FIG. 1). Once calculated, personalized banking engine 120 may then utilize this data to detect a surplus of funds in one or more financial accounts.

This surplus may be calculated in accordance with any suitable techniques. For example, as shown in FIG. 3, a threshold monetary value is represented by line 306, which exceeds the average daily account balance 304 by some amount. This amount may be calculated or otherwise selected to function as a buffer such that even if the current balance is reduced by this amount, as shown by line 308, the current account balance will not be negative or otherwise be overdrawn. For example, the calculated threshold value may be some percentage (e.g., 10%, 20%, etc.) of average daily account balance 304.

Upon detecting a surplus condition, the present aspects include personalized banking engine 120 calculating, projecting, or otherwise forecasting an account balance for a time period in the future. These calculations may be based upon, for example, one or more cognitive computing techniques and/or predictive modeling techniques, which may attempt, for example, to forecast a user's future account balance based upon spending history, financial transactions associated with the user's accounts, the frequency and/or amount of deposits to the user's financial, other user's account history and/or spending habits with similar demographics, etc. An example of a forecasted account balance is shown in FIG. 3 as broken line 302.2, while the user's previous and current account balances are shown in FIG. 3 as solid line 301.1.

To provide an illustrative example referring to FIG. 3, personalized banking engine 120 may detect an initial surplus at time 310. In this example, time periods are measured in days, but aspects include the calculation of time periods in accordance with any suitable unit of time measurement (e.g., weeks, hours, minutes, seconds, etc.). Personalized banking engine 120 may then calculate a set of time periods (e.g., from one to 10 days) and, for each one, an associated statistical probability that represents a likelihood of the user's account balance remaining above in excess of the average daily account balance by the threshold value. An example of a set of calculations is provided below in Table 1.

TABLE 1

| Number of days | Statistical probability of user's account balance retaining a surplus |
|---|---|
| 0 (Current) | 100% |
| 1 | 97% |
| 2 | 90% |
| 3 | 82% |
| 4 | 78% |
| 5 | 68% |
| 6 | 62% |
| 7 | 58% |
| 8 | 55% |
| 9 | 72% |
| 10 | 85% |

As shown in Table 1, personalized banking engine 120 may calculate various degrees of statistical probabilities based upon the forecasted future account balance. As shown in FIG. 3, it becomes less likely that the forecasted account balance will include a surplus of funds until day 9, which may represent, for example, a date associated with a regularly recurring deposit. Therefore, aspects include personalized banking engine 120 selecting a number of days from when the surplus is detected for which a statistical probability exceeds a threshold likelihood of the balance of the user's first financial account remaining above the threshold value.

This may include, for example, analyzing the results similar to those shown above in Table 1 to determine a number of consecutive days for which a threshold likelihood is continuously exceeded. Using the example values shown in Table 1, assume that the threshold likelihood is selected as 75%. In such a case, personalized banking engine 120 may calculate the number of days as 4. Aspects include personalized banking engine 120 then transferring funds from the user's account to another financial account that bears a higher interest rate for four days, after which time personalized banking engine 120 may transfer the funds back to the original account. The amount of these funds may be, for example, a difference between the threshold value and the average daily account balance, as shown in FIG. 3 by the reduction in the forecasted account balance represented by line 308. In this way, personalized banking engine 120 facilitates automatic optimization of accrued interest among a user's accounts with a minimal likelihood of the user having to intervene and/or the transfer resulting in an overdraft or negative account balance.

In various aspects, personalized banking engine 120 may transfer funds back to the user's account in varying amounts to further maximize accrued interest. For example, the entire amount of the funds may be transferred back, or a lesser amount may be transferred to bring the balance of the user's first financial account back to the average daily account balance.

Additionally or alternatively, personalized banking engine 120 may calculate the number of days for which to keep the transferred funds in the higher interest-bearing account by taking into consideration the amount of time required for funds to clear or be available for withdrawal. For example, personalized banking engine 120 may determine that it takes one business day for funds to be available for withdrawal by the user after a transfer is made. Using the above example, personalized banking engine 120 may compensate for this business day and transfer funds at the end of the third day instead of the fourth day.

Furthermore, various aspects include personalized banking engine 120 continuing to monitor the user's current account balance once funds have been transferred out of the lower interest-bearing account. Thus, in the event that the forecasted account balance is inaccurate, personalized banking engine 120 may transfer funds back to the user's lower interest-bearing account even when the number of calculated days has not yet expired.

For example, personalized banking engine 120 may determine when one or more transactions are pending but have not yet cleared and therefore have not yet affected the user's current account balance. Personalized banking engine 120 may, however, use the amount of one or more pending transactions to determine whether, upon being cleared, the user's account would be overdrawn or otherwise negatively impacted. In such a scenario, personalized banking engine 120 may transfer funds back into the lower interest-bearing account prior to the expiration of the number of days discussed above.

Additionally or alternatively, personalized banking engine 120 may use the amount of pending transactions as part of a condition to determine whether to initially transfer money out of the user's lower interest-bearing account to the user's higher interest-bearing account, thereby compensating for pending transactions when determining whether a surplus exists. In this way, personalized banking engine 120 may actively track and monitor a user's account while transfers are pending to ensure that a user's financial account is not negatively impacted.

In any event, the current aspects include personalized banking engine 120, upon transferring a user's funds between accounts and/or determining that a transfer may be preferable or necessary, notify client device 102 in accordance with any suitable techniques. For example, personalized banking engine 120 may transmit a push notification, a text message, an email, etc., to client device 102 to keep the user up-to-date regarding the status of account transfers and other recommendations.

Figure 4:
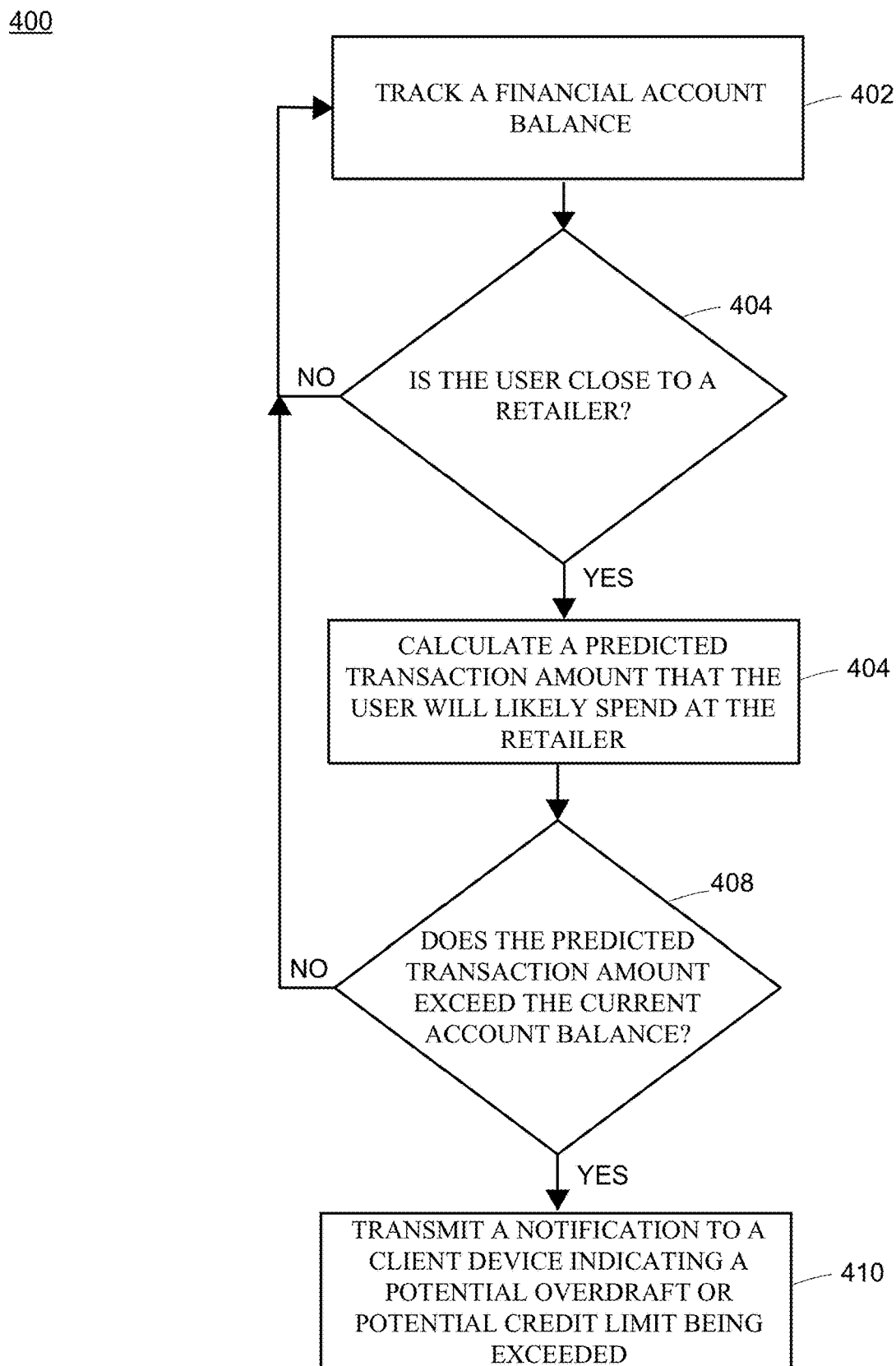
FIG. 4 illustrates an exemplary computer-implemented method flow 400 in accordance with one aspect of the present disclosure.

Exemplary Computer-Implemented Method of Preventing Account Overdrafts and Excessive Credit Spending FIG. 4 illustrates an exemplary computer-implemented method flow 400 in accordance with one aspect of the present disclosure. In the present aspects, one or more portions of method 400 (or the entire method 400) may be implemented by any suitable device, and one or more portions of method 400 may be performed by more than one suitable device in combination with one another. For example, one or more portions of method 400 may be performed by client device 102 and/or personalized banking engine 120, as shown in FIG. 1. In one embodiment, method 400 may be performed by any suitable combination of one or more processors, applications, algorithms, and/or routines. For example, method 400 may be performed via one or more processors 122 executing instructions stored in cognitive computing and predictive modeling application 127 in conjunction with data collected, received, and/or generated via personalized banking engine 120.

Method 400 may start when one or more processors track a user's financial account balance (block 402). In the present aspects, the user's financial account balance may be tracked via a personalized banking engine receiving financial account data from one or more financial institutions for which the user has provided authorization. For example, as discussed herein, a personalized banking engine may access the user's account information via a secure connection, using the user's provided password and logon information.

Method 400 may include one or more processors determining whether a user is close to a retailer and/or whether a user is visiting a retailer's website (block 404). This may include, for example, a personalized banking engine monitoring a user's physical location and/or websites the user is visiting to determine that a user is close to a particular physical retail location and/or currently navigating a retailer's website, as further discussed herein (block 404). If so, method 400 may continue (block 406). If not, method 400 may revert back to continuing to monitor the user's financial account balance (block 402) and the user's physical location and/or websites the user is visiting (block 404).

Method 400 may include one or more processors calculating a predicted transaction amount that the user will likely spend at the particular retailer (block 406) previously identified (block 404). Method 400 may include one or more processors, upon detecting that a user is close to a retailer or visiting a retail website, calculating a predicted transaction amount that the user is likely to spend at that retailer with a statistical probability exceeding a threshold probability (block 406). Again, this calculation may be based upon any suitable cognitive computing and/or predictive modeling techniques, such as those leveraging demographic data or other data as discussed herein (block 406).

Method 400 may include one or more processors determining whether the calculated predicted transaction amount (block 404) exceeds the user's current account balance (block 408). If so, method 400 may continue (block 410). If not, method 400 may revert back to continuing to monitor the user's financial account balance (block 402) and the user's physical location and/or websites the user is visiting (block 404).

Method 400 may include one or more processors transmitting a notification to a user's client device indicating a potential overdraft of the user's credit limit being potentially exceeded (block 410). Again, these notifications may include, for example, push notifications, email messages, text messages, etc. (block 410).

Figure 5:
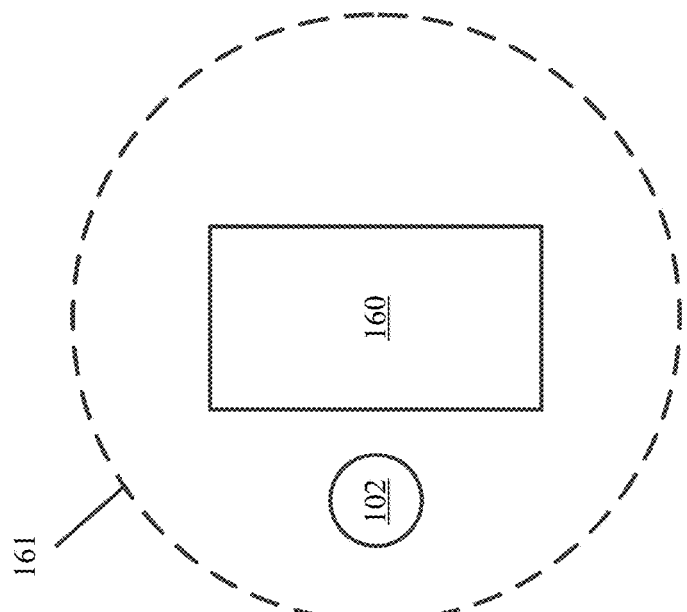
FIG. 5 illustrates an exemplary use case 500 in accordance with one aspect of the present disclosure.
Figure 5:
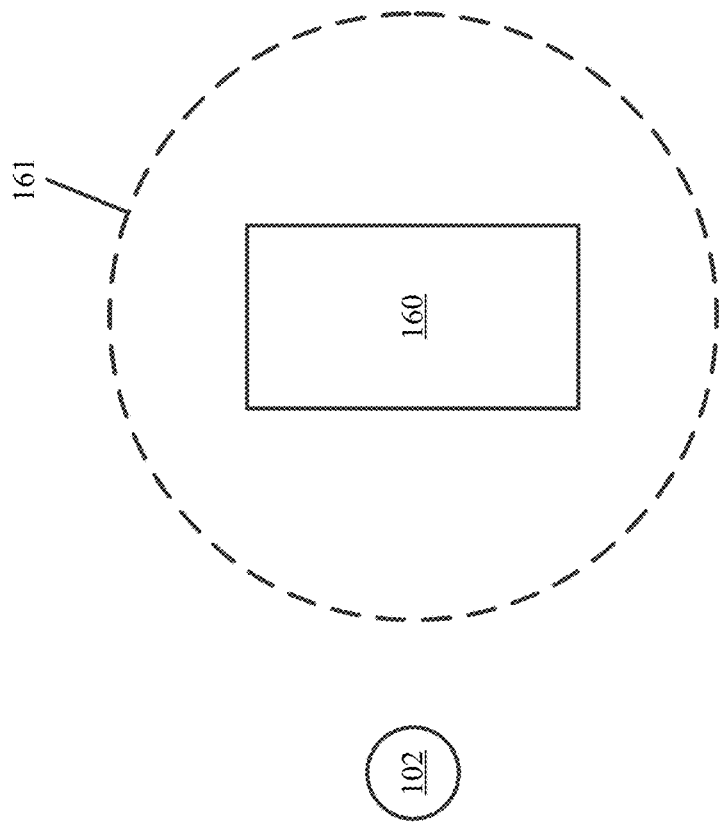

Exemplary Use Case for Preventing Account Overdrafts and Excessive Credit Spending FIG. 5 illustrates an exemplary use case 500 for preventing account overdrafts and excessive credit spending. FIG. 5 includes a first time period 502, a second time period 504, a client device 102, a retailer 160, and a boundary 161. The use case 500 illustrated in FIG. 5 may be an example operation of the disclosed systems and methods for preventing account overdrafts and excessive credit spending. During time period 502, a user (not shown) may be in possession of client device 102. Client device 102 is in relative proximity to the retailer 160, however, the client device has not crossed boundary 161. Boundary 161 may be the geofence described above as determined by client device 102, personalized banking engine 120, retailer 160, or some combination thereof. During this time period, personalized banking engine 120, or client device 102, may track a current account balance for the user's financial account utilizing financial account data.

At time period 504, the user and client device 102 have crossed boundary 161 and are located within the proximity of the retailer 160. Personalized banking engine 120, or client device 102, may determine that the user is located within a threshold distance of the retailer 160. Personalized banking engine 120, or client device 102, may calculate a predicted transaction amount that the user is likely to spend at the retailer 160. Personalized banking engine 120, or client device 102, may use any of the different types of methods described above to calculate the predicted transaction amount. In the event that the predicted transaction amount exceeds the current account balance for the user's financial account and the user is located within the threshold distance of the retailer 160, personalized banking engine 120, or client device 102, may selectively transmit a notification to client device 102 associated with the user. If the predicted transaction amount does not exceed the current account balance for the user's financial account, or the user is not located within the threshold distance of retailer 160, a notification does not need to be sent. In some embodiments, if the predicted transaction amount does not exceed the current account balance for the user's financial account personalized banking engine 120 may selectively transmit a notification to client device 102 alerting the user to the fact that he or she has sufficient funds in his or her financial account to cover a purchase totaling the predicted transaction amount.

Exemplary Computer-Implemented Method for Notifying a User of a Potential Overdraft In one aspect, a computer-implemented method for notifying a user of a potential overdraft may be provided. The method may include: (1) tracking a current account balance for a user's financial account utilizing financial account data; (2) determining when the user is located within a threshold distance of a retailer; (3) calculating a predicted transaction amount that the user is statistically most likely to spend at the retailer; and/or (4) selectively transmitting, by the one or more processors, a notification to a client device associated with the user indicating that a potential overdraft may occur when (i) the predicted transaction amount exceeds the current account balance for the user's financial account, and (ii) the user is located within the threshold distance of the retailer. The method may include additional, less, or alternate actions, including those discussed elsewhere herein.

For instance, in various aspects, the predicted transaction amount may be calculated as an output of a weighting function that weights a plurality of inputs that include (i) the retailer, and (ii) the user's demographic information. The user's demographic information may include, for example, the user's age, income level, and geographic region.

Additionally or alternatively, the method may include storing spending data in a database, which may be associated with each of a plurality of other users. The spending data may indicate an average amount spent by each of the plurality of users at the retailer over a period of time and/or demographic information associated with each of the plurality of other users. In such a case, the method may include calculating the predicted transaction amount by (i) identifying a subset of a plurality of other users having demographic information matching that of the user; and (ii) averaging, over each of the identified subset of the plurality of users, the average amount spent by each of the subset of the plurality of users.

Additionally or alternatively, the predicted transaction amount may be calculated by first calculating dominant portions of the demographic information, for each of the subset of the plurality of other users, which causes the greatest variance in the average amount spent by each of the subset of the plurality of other users. The method may include calculating the predicted transaction amount as an output of a weighting function that weights a plurality of inputs including the user's demographic information based upon the dominant portions of the demographic information from each of the subset of the plurality of other users.

Additionally or alternatively, the method may include selectively transmitting the notification to the client device by sending a push notification to the client device, sending an email message to the client device, and/or sending a text message to the client device.

Exemplary System for Notifying a User of a Potential Overdraft

In yet another aspect, a system for notifying a user of a potential overdraft may be provided. The system may include: (1) a client device configured to periodically transmit location data indicative of a current location of the client device and to receive and display notifications associated with a user's financial account; and/or (2) one or more back-end components configured to: (a) track a current account balance for the user's financial account utilizing financial account data; (b) determine when the user is located within a threshold distance of a retailer based upon the periodically transmitted location data; (c) calculate a predicted transaction amount that the user is statistically most likely to spend at the retailer; and/or (d) selectively transmit a notification to the client device associated with the user indicating that a potential overdraft may occur when (i) the predicted transaction amount exceeds the current account balance for the user's financial account, and (ii) the user is located within the threshold distance of the retailer The system may include additional, less, or alternate components, including those discussed elsewhere herein.

For instance, the one or more back-end components may be further configured to calculate the predicted transaction amount as an output of a weighting function that weights a plurality of inputs that include (i) the retailer, and (ii) the user's demographic information. The user's demographic information may include, for example, the user's age, income level, and geographic region.

Additionally or alternatively, the one or more back-end components may be further configured to: (e) store spending data in a database associated with each of a plurality of other users, the spending data indicating an average amount spent by each of the plurality of users at the retailer over a period of time; (f) identify a subset of a plurality of other users having demographic information that matches that of the user; and/or (g) calculate the predicted transaction amount by averaging, over each of the identified subset of the plurality of users, the average amount spent by each of the subset of the plurality of users.

Additionally or alternatively, the system may include the one or more back-end components storing spending data in a database, which may be associated with each of a plurality of other users. The spending data may indicate an average amount spent by each of the plurality of users at the retailer over a period of time and/or demographic information associated with each of the plurality of other users. In such a case, the system may include the one or more back-end components calculating the predicted transaction amount by (i) identifying a subset of a plurality of other users having demographic information matching that of the user; and (ii) averaging, over each of the identified subset of the plurality of users, the average amount spent by each of the subset of the plurality of users.

Additionally or alternatively, the predicted transaction amount may be calculated by the one or more back-end components first calculating dominant portions of the demographic information, for each of the subset of the plurality of other users, which causes the greatest variance in the average amount spent by each of the subset of the plurality of other users. The system may include the one or more back-end components calculating the predicted transaction amount as an output of a weighting function that weights a plurality of inputs including the user's demographic information based upon the dominant portions of the demographic information from each of the subset of the plurality of other users.

Additionally or alternatively, the system may include the one or more back-end components selectively transmitting the notification to the client device by sending a push notification to the client device, sending an email message to the client device, and/or sending a text message to the client device.

Exemplary System for Moving Excess Monies Between Financial Accounts

In yet another aspect, a system to sweep excess monies into another financial account may be provided. The system may include one or more processors and/or transceivers configured to: (1) track financial account data including (i) financial transactions associated with a user's first and second financial account, and (ii) a current account balance associated with the user's first and second financial account; (2) calculate an average daily account balance associated with the user's first financial account based upon the financial account data; (3) detect a surplus when the current account balance associated with the user's first financial account exceeds the average daily account balance by a threshold value; (4) calculate a number of days from when the surplus is detected for which a statistical probability exceeds a threshold likelihood of the balance of the user's first financial account remaining in excess of the average daily account balance; and/or (5) transfer money from the first financial account to the second financial account for the calculated number of days in an amount equal to a difference between the threshold value and the average daily account balance.

In some embodiments of the system, the first financial account accrues interest at a rate that is less than that of the second financial account. In other embodiments, the system further includes at the expiration of the calculated number of days, transferring, by the one or more processors, money from the second financial account to the first financial account. Additionally, in some embodiments the money is transferred from the second financial account to the first financial account in an amount required to bring the balance of the user's first financial account back to the average daily account balance. In another aspect of the system, the act of calculating the number of days includes compensating for time required for the money to be available in the first financial account upon being transferred from the second financial account to the first financial account.

In yet another aspect of the system, the system is further configured to: (6) determine whether a pending transaction, upon being cleared, would result in the user's first financial account being overdrawn, and wherein the act of transferring money from the first financial account to the second financial account further comprises selectively transferring the money from the first financial account to the second financial account only when the pending transaction, upon being cleared, would not result in the user's first financial account being overdrawn. The system may also be further configured to: (7) transmit a notification to a client device associated with the user indicating that money has been transferred from the first financial account to the second financial account.

Figure 6:
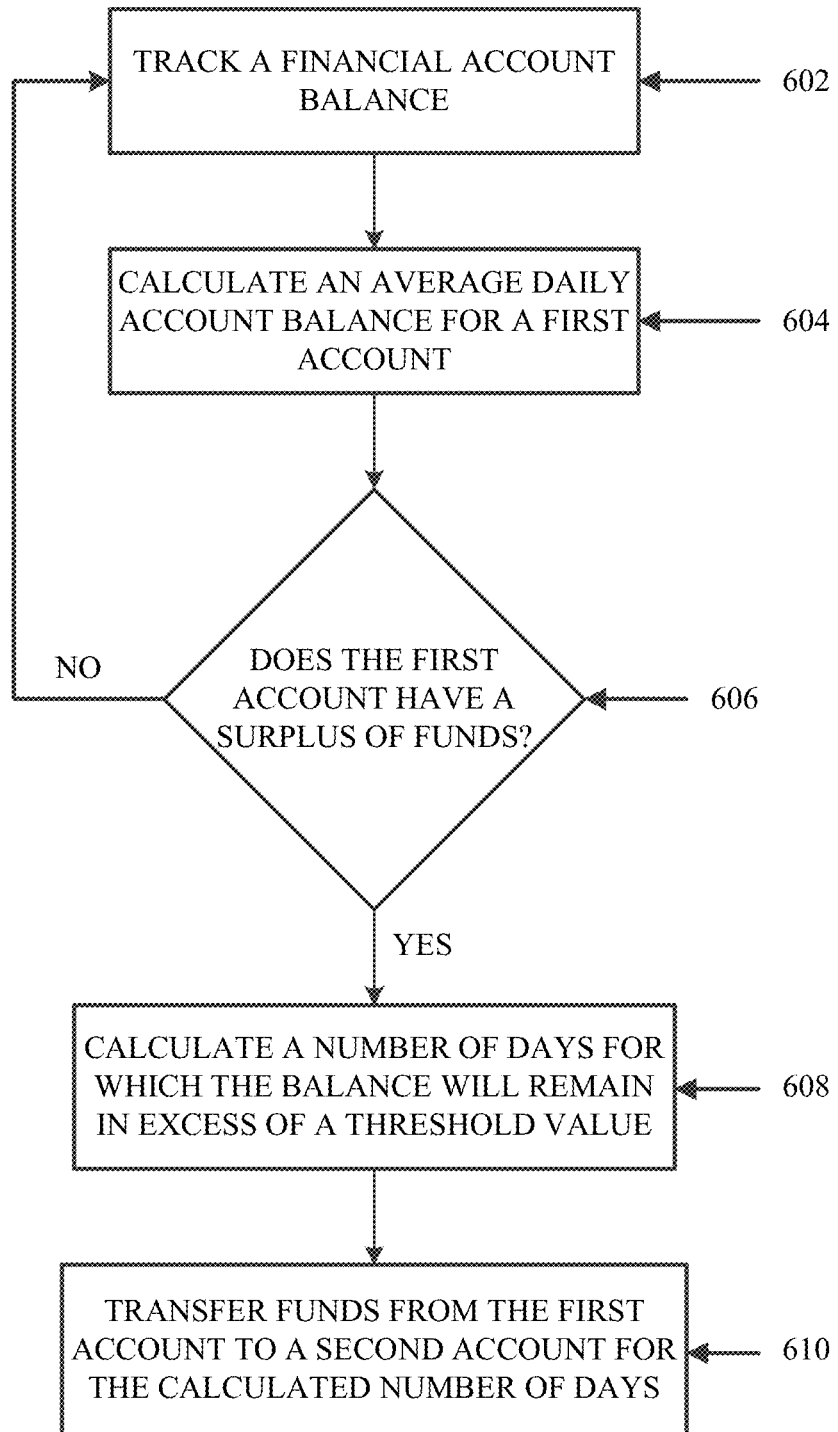
FIG. 6 illustrates an exemplary computer-implemented method flow 600 in accordance with one aspect of the present disclosure.

Exemplary Computer-Implemented Method of Optimizing Interest Accrual Between a User's Financial Accounts FIG. 6 illustrates an exemplary computer-implemented method flow 600 in accordance with an aspect of the present disclosure. In the present aspects, one or more portions of method 600 (or the entire method 600) may be implemented by any suitable device, and one or more portions of method 600 may be performed by more than one suitable device in combination with one another. For example, one or more portions of method 600 may be performed by client device 102 and/or personalized banking engine 120, as shown in FIG. 1. In an embodiment, method 600 may be performed by any suitable combination of one or more processors, applications, algorithms, and/or routines. For example, method 600 may be performed via one or more processors 122 executing instructions stored in cognitive computing and predictive modeling application 127 in conjunction with data collected, received, and/or generated via personalized banking engine 120.

Method 600 may start when one or more processors track a user's financial account balance (block 602). In the present aspects, the user's financial account balance may be tracked via a personalized banking engine receiving financial account data from one or more financial institutions that the user has provided authorization. For example, as discussed herein, a personalized banking engine may access the user's account information via a secure connection, using the user's provided password and logon information, etc.

Method 600 may include one or more processors calculating an average daily account balance (block 604) using the tracked financial account balance data (block 602). This may include, for example, calculating an average daily account balance from any suitable window and in accordance with any suitable techniques, as further discussed herein (block 604).

Method 600 may include one or more processors determining whether the user's tracked account has a surplus of funds (block 606). This may be determined, for example, when the user's account balance exceeds a threshold value (block 606). If so, then method 600 may continue (block 606). If not, method 600 may revert back to continuing to track the user's financial account balance (block 602).

Method 600 may include one or more processors calculating a number of days for which the user's account balance will remain in excess of the threshold value (block 608). This threshold value may include, for example, the same threshold value used for the determination of whether the user's account has a surplus of funds (block 608). This calculation may be performed, for example, by determining a consecutive number of days in which a threshold statistical probability threshold is exceeded, as discussed further herein (block 608).

Method 600 may include one or more processors transferring funds from the user's tracked account to another account that has a higher interest rate (block 610). This may include, for example, a personalized banking engine communicating with the user's financial institutions to request a funds transfer, such as an electronic funds transfer (EFT), an automated clearing house transfer (ACH), etc. (block 410).

Targeted Offers Based Upon Shopping Profile

Figure 7:
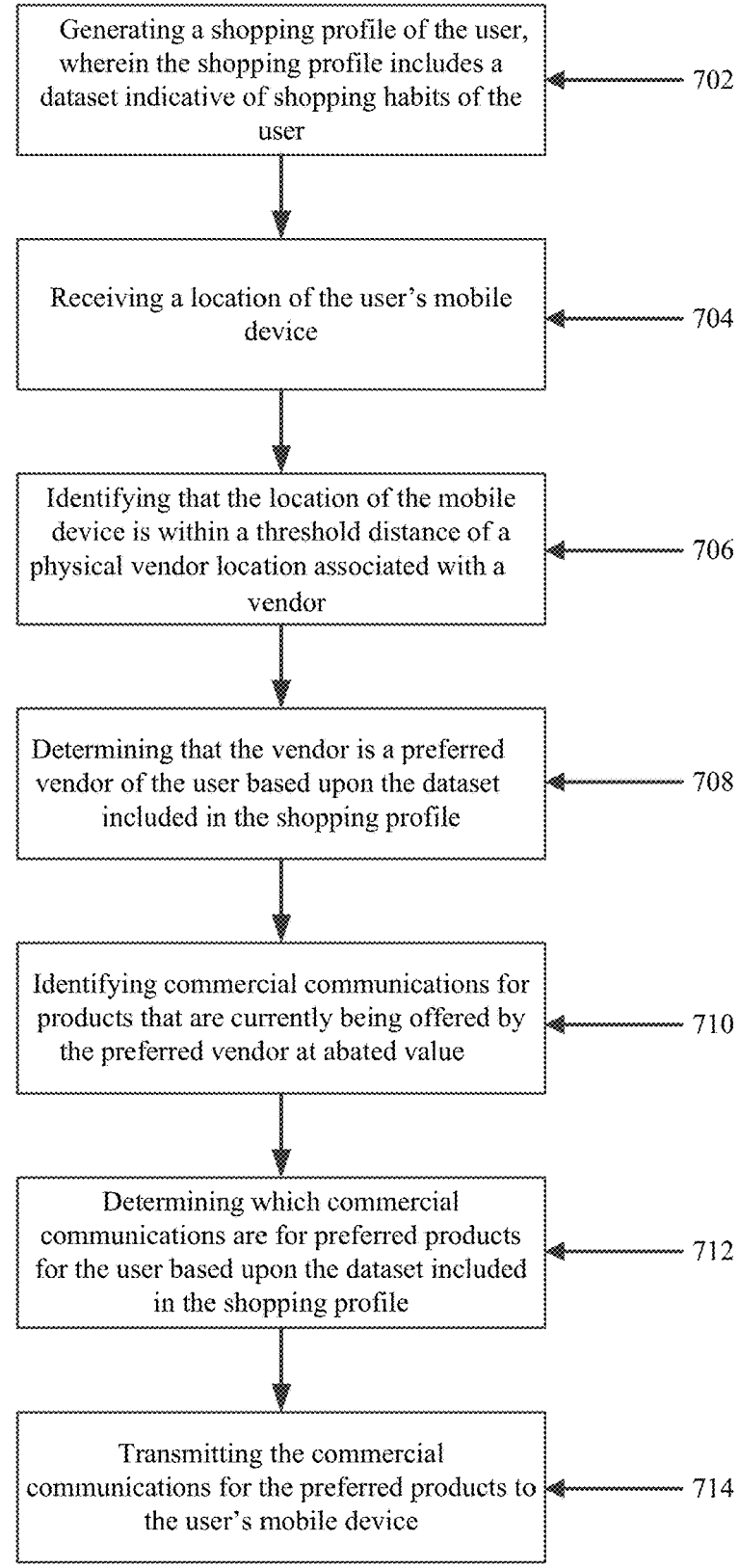
FIG. 7 illustrates an exemplary computer-implemented method flow 700 for generating targeted offers based upon customer shopping profiles.

FIG. 7 illustrates an exemplary computer-implemented method 700 in accordance with one aspect of the present disclosure. In the present aspects, one or more portions of method 700 (or the entire method 700) may be implemented by any suitable device, and one or more portions of method 700 may be performed by more than one suitable device in combination with one another. For example, one or more portions of method 700 may be performed by client device 102 and/or personalized banking engine 120, as shown in FIG. 1. In one embodiment, method 700 may be performed by any suitable combination of one or more processors, applications, algorithms, and/or routines. For example, method 700 may be performed via one or more processors 122 executing instructions stored in cognitive computing and predictive modeling application 127, and/or instructions stored in commercial communication module 133, in conjunction with data collected, received, and/or generated via personalized banking engine 120.

The method 700 may include generating, via one or more processors, a shopping profile of the user wherein the shopping profile includes a dataset indicative of shopping habits of the user (block 702). The shopping profile for the user may be built (with user permission) using financial transaction data, such as the financial transaction data stored in the financial data profiles 180. The method 700 may include receiving, via the one or more processors, a location of the user's mobile device (block 704). The location of the user's device may be determined by the location acquisition unit 112 of the client device 102. The method 700 may include identifying, via the one or more processors that the location of the mobile device is within a threshold distance of a physical vendor location associated with a vendor (block 706). The method 700 may include determining, via the one or more processors, that the vendor is a preferred vendor of the user based upon the dataset included in the shopping profile (block 708).

If the vendor is a preferred vendor, the method may include, identifying, via the one or more processors, commercial communications for products that are currently being offered by the preferred vendor at abated value (block 710). Accordingly, the method may include determining, via the one or more processors, which commercial communications are for preferred products for the user based upon the dataset included in the shopping profile (block 712). Further, the method may include, when there are any preferred products currently offered by the preferred vendor and the mobile device is within the threshold vicinity of the physical vendor location, transmitting, via the one or more processors, the commercial communications for the preferred products to the user's mobile device (block 714). The method may include additional, less, or alternate actions, including those discussed elsewhere herein.

In some embodiments of the method, generating, via the one or more processors, the shopping profile of the user (block 702) includes inputting, via the one or more processors, financial transaction data associated with the user into a machine learning program that is trained to generate the shopping profile for the user based upon the financial transaction data.

In some embodiments of the method, the shopping profile for the customer includes at least one or more of (i) the names of merchants at which the user shops; (ii) the frequency the user shops at each merchant; (iii) an average of how much the user spends at each merchant; (iv) the types of products purchased at each merchant; (v) the brand names of products purchased at each vendor by the user, or some combination thereof. The shopping profile may be customizable by the customer.

In some embodiments of the method, the commercial communications include an offer of reward points if a purchase of the preferred product is completed within a given amount of time. Similarly, the commercial communications may include an offer of reward points if a purchase of the preferred product is completed using a designated payment type. The designated payment type may be a particular credit account, a particular financial account, or any other type of payment account associated with the user. In some embodiments of the method, the commercial communications include bundled pricing for a bundle of products offered by the preferred merchant. For example, the bundled products may be products and/or services that are commonly bought together such as a mortgage loan and homeowners insurance, or an automobile and automobile insurance, etc. In yet other embodiments, the commercial communications may include an offer of reward points if a purchase of the preferred product is completed via a loan product.

In some embodiments, the shopping profile for the user includes a predicted life event, and the preferred offer is based upon the predicted life event. The life event may be predicted as part of generating the shopping profile (block 702), or may be predicted independent of the method 700. The predicted life event may include at least one of an educational event, an age-related event, a birth of a child, a marriage, or some combination thereof. The educational event may be the user graduating from an education institution, or a child or other member of the user's family graduating from an educational institution. The age-related event may be the user turning a particular age, and/or a member of the user's family (e.g., a spouse or child) turning a particular age. The birth of the child may be the birth of a child of the user, the birth of a child for a member of the user's family, or the birth of a child for another individual connected to the user. Similarly, the marriage may be the user's marriage, or the marriage of any member of the user's family, any friend of the user, or any other individual associated with the user.

Exemplary Use Case for Generating Targeted Offers Based Upon Shopping Profile

Figure 8:
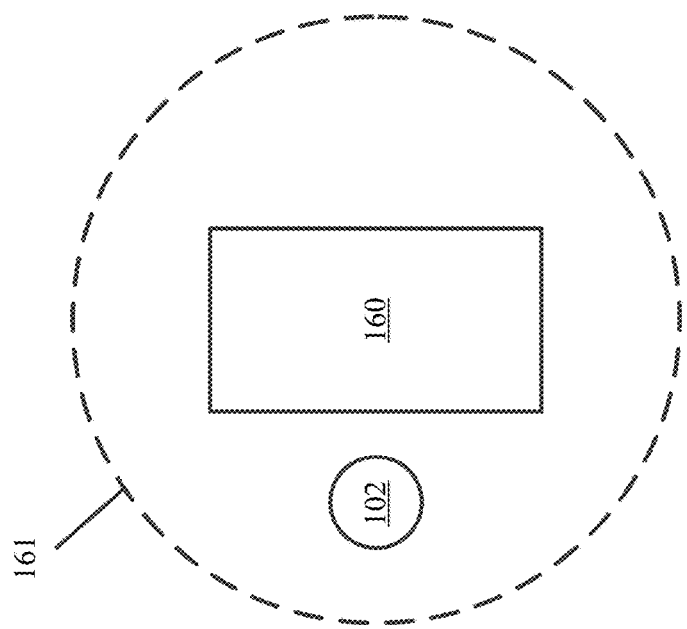
FIG. 8 illustrates an exemplary use case 800 in accordance with one aspect of the present disclosure.
Figure 8:
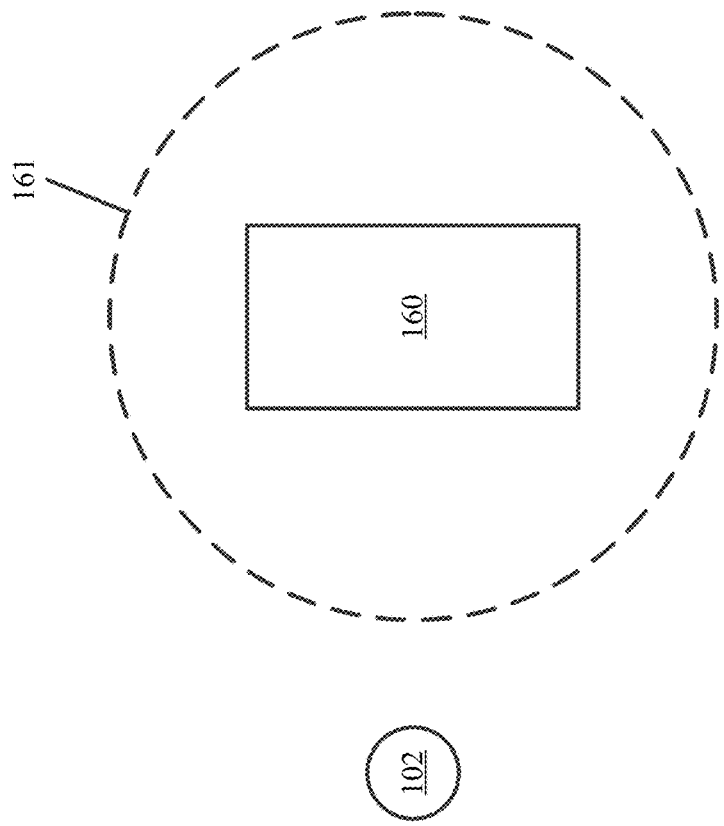

FIG. 8 illustrates an exemplary use case 800 for presenting targeted offers for preferred products to a user via a mobile device. FIG. 8 includes a first time period 802, a second time period 804, a client device 102, a retailer 160, and a boundary 161. The use case 800 illustrated in FIG. 8 may be an example operation of the disclosed systems and methods for presenting targeted offers for preferred products to a user via a mobile device. During time period 802, a user (not shown) may be in possession of client device 102. Client device 102 is in relative proximity to the retailer 160. However, client device 102 has not crossed boundary 161. Boundary 161 may be the geofence described above as determined by client device 102, personalized banking engine 120, retailer 160, or some combination thereof. During this time period personalized banking engine 120, or client device 102, may generate a shopping profile for the user. Personalized banking engine 120, or client device 102, may use any of the different types of methods described above to generate the shopping profile. In some embodiments, the shopping profile is not built until after the user has crossed boundary 161.

At time period 804, the user and client device 102 have crossed boundary 161 and are located within the proximity of retailer 160. Personalized banking engine 120, or client device 102, may determine that the user is located within the threshold distance of retailer 160. Personalized banking engine 120, or client device 102, may determine that the retailer 160 is a preferred vendor for the user. Personalized banking engine 120, or client device 102, may identify relevant commercial communications for the user associated with the preferred merchant. For example, the commercial communications may be targeted offers for goods or services of interest to the user. The goods or services that are of interest to the user may be determined by personalized banking engine 120, or client device 102, analyzing the shopping profile of the user. These commercial communications may then be transmitted to client device 102 allowing the user to take action on the commercial communications. The user may purchase the goods or services identified in the commercial communications, or in some cases the user may decide based upon the notification to enter retailer 160 to investigate the promotional offers.

Targeted Offers to Inactive Account Holders

Figure 9:
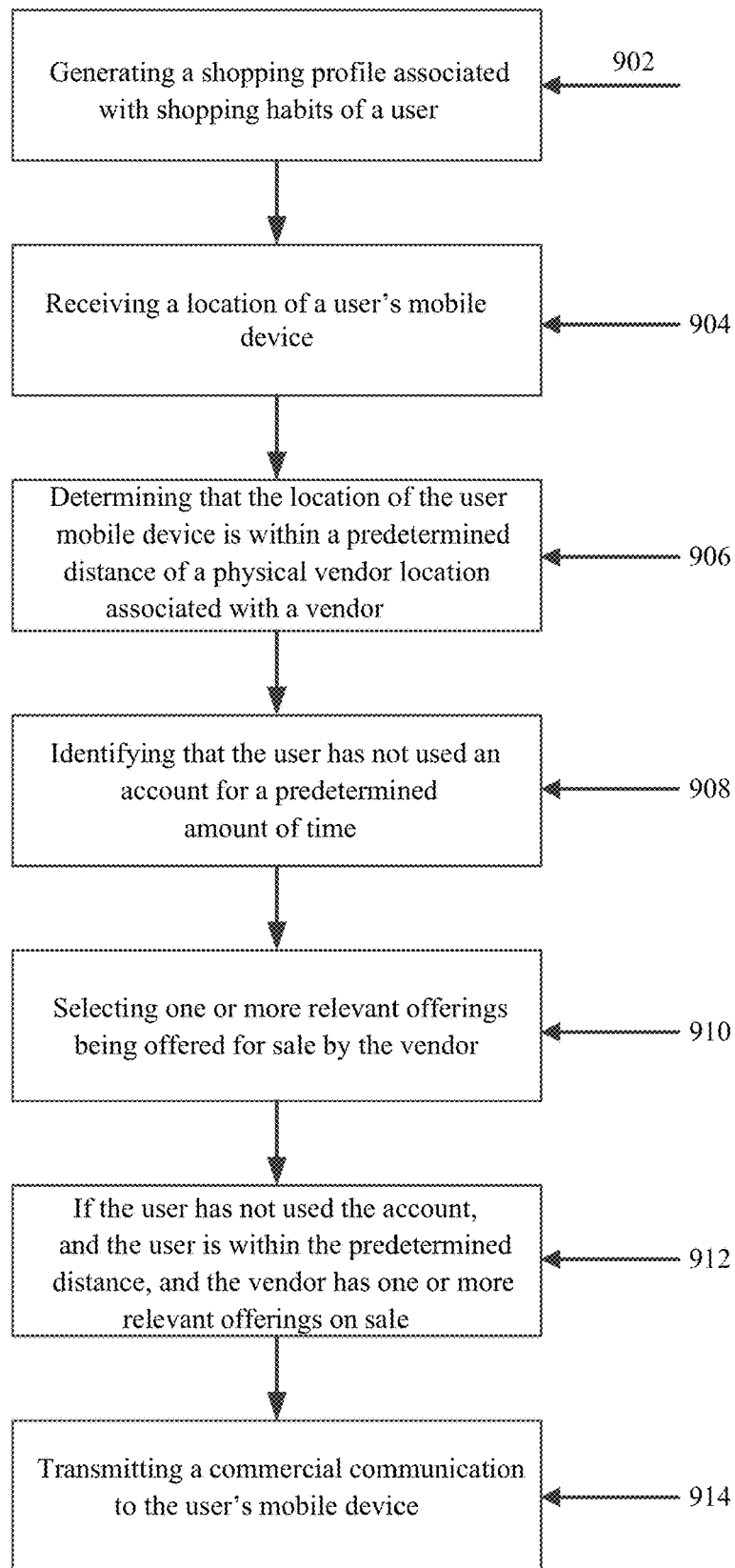
FIG. 9 illustrates an exemplary computer-implemented method flow 900 in accordance with one aspect of the present disclosure.

FIG. 9 illustrates an exemplary computer-implemented method 900 in accordance with one aspect of the present disclosure. In the present aspects, one or more portions of method 900 (or the entire method 900) may be implemented by any suitable device, and one or more portions of method 900 may be performed by more than one suitable device in combination with one another. For example, one or more portions of method 900 may be performed by client device 102 and/or personalized banking engine 120, as shown in FIG. 1. In one embodiment, method 900 may be performed by any suitable combination of one or more processors, applications, algorithms, and/or routines. For example, method 900 may be performed via one or more processors 122 executing instructions stored in cognitive computing and predictive modeling application 127, and/or instructions stored in commercial communication module 133, in conjunction with data collected, received, and/or generated via personalized banking engine 120.

The method 900 may include receiving financial transaction data associated with financial transactions initiated by a user, and generating, via one or more processors, a shopping profile associated with shopping habits of a user (block 902). The shopping profile may include a dataset including the received financial transaction data, and/or other data indicative of a user's shopping preferences (e.g., favorite stores, favorite products), or transaction history. The method 900 may include receiving, via the one or more processors, location data from a user's mobile device in real-time or near real-time (block 904), and using the mobile device location to determine, via the one or more processors, that the user is at, or near, a specific vendor location (block 906). Whether a user is at, or near, a specific vendor location may be determined by the user's mobile device crossing a predetermined threshold distance of the physical vendor location. The threshold distance may be decided by the user, the vendor, or by personalized banking engine 120.

The method 900 may include identifying, via the one or more processors, that the user has not used an account for a predetermined amount of time (block 908). The account may be an inactive credit card account, an inactive checking account, an inactive debit account, an inactive mobile account, an inactive electronic money account, or an inactive prepaid account. The account may be identified by determining which accounts in the financial profile 180 for the user are related, or relevant, to the vendor at the physical vendor location. The predetermined amount of time may be a time set by personalized banking engine 120 or a time set by the user. The predetermined amount of time may be a number of days, weeks, months, or even years. In some embodiments, the cognitive computing predictive modeling application 127 may determine the predetermined amount of time based upon an analysis of a set of financial data profiles for other users and the amount of time that separates transactions in the corresponding set of financial data profiles for those users.

The method may include determining, via the one or more processors, relevant products being offered for sale by the vendor (block 910). The relevant products may be products that are being offered at abated value, or discounted pricing, or the relevant products may be products that are denoted as preferred products for the user in their shopping profile, or some combination thereof. The cognitive computing predictive modeling application 127 may determine which products are relevant to the user based upon the user's financial transactions, the financial profiles of users with similar demographics, predicted shopping habits for the user based upon predicted events, or some combination thereof.

If the account has not been used in the predetermined amount of time, and the merchant is offering relevant products, and the user, or their mobile device, has crossed a predetermined threshold (block 912), the method 900 may include transmitting a commercial communication to the user's mobile device, wherein the commercial communication identifies the one or more relevant products, and a rewards communication to receive rewards if the inactive account is used to complete a purchase of the one or more relevant products at the vendor (block 914). The rewards may be for bonus or additional points if the inactive account is used to conduct a financial transaction that day or within another a time period to facilitate making online "point of sale" offers in real-time or near real-time to holders of inactive accounts. The method may include additional, less, or alternate actions, including those discussed elsewhere herein.

For example, the method may include determining, via the one or more processors, that the vendor is a preferred vendor of the user based upon information within the user's shopping profile before determining offers for products on sale that are currently being offered by the preferred vendor. Similarly, the method may include determining, via the one or more processors, which offers are preferred offers for the user based upon information within the user's shopping profile, and only transmitting notifications to the user's mobile device associated with preferred offers.

In some embodiments, the shopping profile for the user includes a predicted life event, and the preferred offer is based upon the predicted life event. The predicted life event may be predicted as part of generating the shopping profile (block 902), or may be predicted independent of the method 900. The predicted life event may include children of the user, or the user, graduating from high school or college. The predicted life event may include an age related event (e.g., the user or their children turning 16, 18, or 22), and the offer may be an offer for a vehicle loan. Similarly, the predicted life event may include a birth of a child, or a marriage. The birth or marriage may be expected, or not expected, by cognitive computing predictive modeling application 127. Additionally, the predicted life event may include an increase in income, or a move to a new residence or home.

In some embodiments, the offer to the user included in the commercial communication includes an interest-free transaction offered to the user if the transaction is completed with the inactive account. The interest-free transaction may be a transaction executed with the inactive account (e.g., inactive credit card) where after the transaction is completed the user is not obligated to incur any interest on his or her account as a result of the transaction. The interest-free transaction may run for a period of time (e.g., a month, a year, etc.) before the user is obligated to pay interest on the transaction.

In some embodiments of the method, generating, via the one or more processors, the shopping profile of the user (block 902) includes inputting, via the one or more processors, financial transaction data associated with the user into a machine learning program that is trained to generate the shopping profile for the user based upon the financial transaction data, with the user's permission, using the financial transaction data. In some embodiments of the method, the shopping profile for the customer includes at least one or more of: (i) the names of merchants at which the user shops; (ii) the frequency the user shops at each merchant; (iii) an average of how much the user spends at each merchant; (iv) the types of products purchased at each merchant, (v) the brand names of products purchased at each vendor by the user; or some combination thereof. The shopping profile may be customizable by the customer.

Exemplary Use Case for Targeted Offers to Inactive Account Holders

Figure 10:
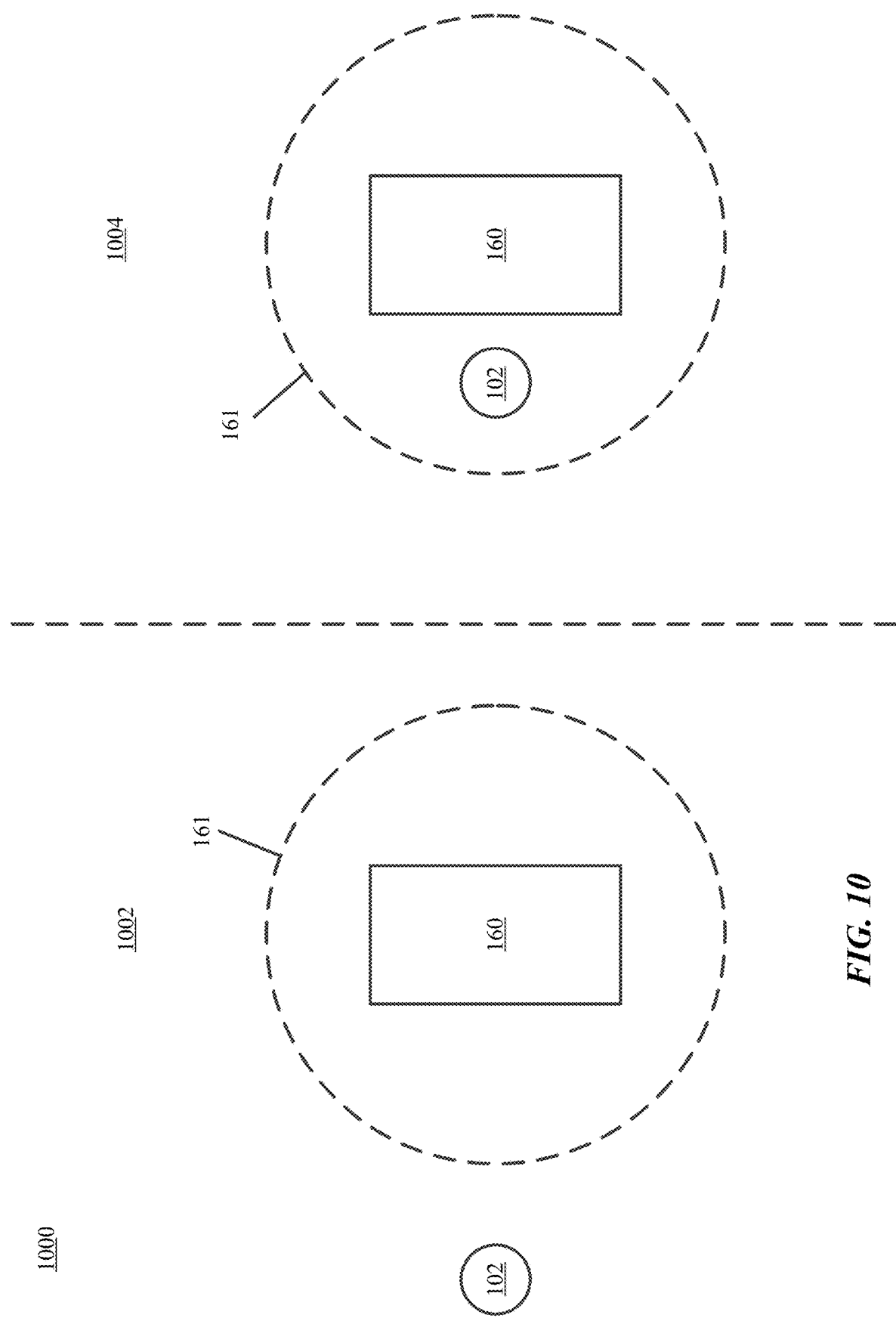
FIG. 10 illustrates an exemplary use case 1000 in accordance with one aspect of the present disclosure.

FIG. 10 illustrates an exemplary use case 1000 for presenting targeted offers to inactive account holders via a mobile device. FIG. 10 includes a first time period 1002, a second time period 1004, a client device 102, a retailer 160, and a boundary 161. The use case 1000 illustrated in FIG. 10 may be an example operation of the disclosed systems and methods for presenting targeted offers to inactive account holders to a user via a mobile device. During time period 1002, a user (not shown) may be in possession of client device 102. Client device 102 is in relative proximity to retailer 160, however, the client device has not crossed boundary 161. Boundary 161 may be the geofence described above as determined by client device 102, personalized banking engine 120, retailer 160, or some combination thereof. During this time period, personalized banking engine 120, or client device 102, may generate a shopping profile for the user. Personalized banking engine 120, or client device 102, may use any of the different types of methods described above to generate the shopping profile. In some embodiments, the shopping profile is not built until after the user has crossed boundary 161.

At time period 1004, the user and client device 102 have crossed boundary 161 and are located within proximity of retailer 160. Personalized banking engine 120, or client device 102, may determine that the user is located within the threshold distance of retailer 160. Personalized banking engine 120, or client device 102, may determine that the user has not used a particular account in a predetermined amount of time. Personalized banking engine 120, or client device 102, may identify relevant commercial communications for the user associated with the merchant. For example, the commercial communications may be targeted offers to use the inactive account to purchase goods or services of interest to the user. The goods or services that are of interest to the user may be determined by personalized banking engine 120, or client device 102, analyzing the shopping profile of the user. These commercial communications may then be transmitted to client device 102 allowing the user to take action on the commercial communications. The user may purchase the goods or services identified in the commercial communications, or in some cases the user may decide based upon the notification to enter retailer 160 to investigate the promotional offers.

Exemplary Customer Interaction System

Figure 11:
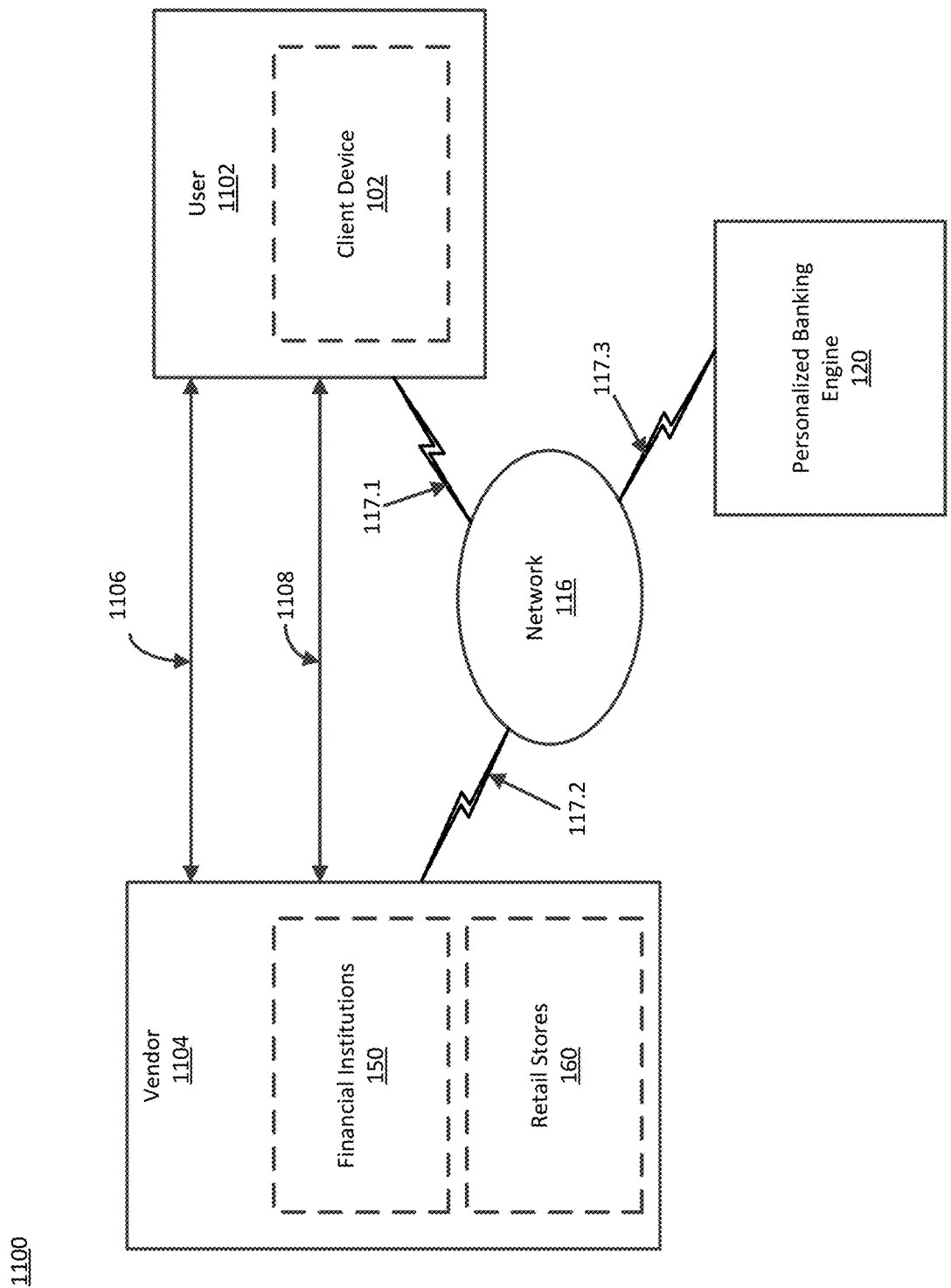
FIG. 11 illustrates an exemplary customer interaction system 1100 in accordance with one aspect of the present disclosure.

FIG. 11 illustrates an exemplary customer interaction system 1100 in accordance with one aspect of the present disclosure. FIG. 11 includes a user 1102, a vendor 1104, a self-service communication channel 1106, a full-service communication channel 1108, a network 116, network connections 117.1, 117.2, and 117.3, and a personalized banking engine 120. FIG. 11 also optionally includes a client device 102, financial institutions 150, and retail stores 160. In some implementations client device 102 is on the person of user 1102, in other implementations client device 102 is independent of user 1102. Similarly, financial institutions 150, or retail stores 160, may be inclusive of vendor 1104, or independent of vendor 1104.

User 1102 may be a user, or customer, of vendor 1104. Accordingly, the interactions between user 1102 and vendor 1104 may be monitored by the overall system 1100, and more particularly, monitored by personalized banking engine 120. User 1102 may have a financial data profile associated with user 1102, such as the example financial data profiles illustrated in FIG. 2. The data collected on user 1102, including the interactions user 1102 has with vendor 1104, may be used to determine rewards to award the user. Personalized banking engine 120 may use machine learning, or cognitive computing techniques, to determine the amount or type of reward that the user may receive for using a self-service communication channel 1106 instead of a full-service communication channel 1108.

Customer interactions may occur over self-service communication channel 1106, or a full-service communication channel 1108. The customer interactions may be reporting issues with an account, or product or service, to vendor 1104, paying a bill to vendor 1104, or some similar type of interaction. Vendor 1104 may be a merchant that user 1102 regularly frequents, or has frequented only once in the past. User 1102 may have an ongoing contractual relationship with vendor 1104. For example, user 1102 may have an insurance policy with vendor 1104. Vendor 1104 in some cases may be a financial institution 150, or retail store 160, with which user 1102 has an ongoing relationship.

Self-service communication channel 1106 may be a communication channel that user 1102 uses to interact with vendor 1104. "Self-service" may mean that user 1102 is responsible for taking the necessary actions to resolve his or her issue or complete his or her transaction. In some embodiments, self-service communication channel 1106 may include a communication tool embedded into a public facing website maintained by vendor 1104, such as a chat client. In other cases, self-service communication channel 1106 may be used by user 1102 to enroll into a program (with vendor 1104) to receive electronic statements for his or her account with vendor 1104, as opposed to paper statements sent through the US Postal Service. In other embodiments, self-service communication channel 1106 may be used by user 1102 to enroll in an automatic payment program with vendor 1104.

Conversely, full-service communication channel 1108 may be any sort of communication channel that requires vendor 1104, or one of its agents, to engage with user 1102. "Full-service" may mean that user 1102 and vendor 1104 must proactively interact with each other to resolve the user's issue or transaction. Some examples may include user 1102 calling a phone number to speak with an operator employed by vendor 1104, user 1102 interacting with a human agent of vendor 1104 via text message, or other means of communication.

In a typical operation of the system 1100, user 1102 may wish to interact with vendor 1104. For example, user 1102 may need to pay an outstanding balance on a bill for an account user 1102 has with vendor 1104. User 1102 may then communicate with vendor 1104 by using self-service communications channel 1106, such as via a website associated with vendor 1104. The user's interaction with vendor 1104 may be logged into a profile for user 1102, such as one of the financial profiles detailed in FIG. 2. At a later time, user 1102 may need to report an issue with a product or service purchased from vendor 1104. User 1102 may then elect to use full-service communication channel 1108 to communicate with vendor 1104, by calling a helpline phone number for vendor 1104, for example. The call from user 1102 to vendor 1104 may be logged on the user's profile with vendor 1104.

These types of interactions may occur over a period of time (e.g., a day, a week, months) between user 1102 and vendor 1104. Personalized banking engine 120, or vendor 1104, may conduct an analysis of the user's interactions with vendor 1104 and determine that user 1102 is utilizing full-service communication channels 1108 with vendor 1104 more than user 1102 is utilizing self-service communication channels 1106 with vendor 1104. Accordingly, personalized banking engine 120 may notify user 1102 that if user 1102 were to increase his or her usage of self-service communication channels 1106, user 1102 would be eligible to receive a reward from vendor 1104. The notification of the reward to user 1102 may include the system 1100, or more particularly personalized banking engine 120, transmitting the reward to the user's mobile device for user 1102 to review.

Example rewards may be a discount on products or services offered by vendor 1104, exclusive purchasing opportunities for products or services offered by vendor 1104 that are not offered to other users, promotional opportunities for purchasing goods or services from other vendors, or in some cases depositing reward points into an account associated with user 1102. The reward points may be used by user 1102 to purchase products or services with vendor 1104 or other vendors. The rewards may be determined based in part upon the user's financial habits, or patterns of spending at retailers. The user's habits and patterns may be determined by tracking the user's financial information as detailed in the description for FIGS. 1 and 2 above.

Monitoring Amount of Customer Interaction Self-Service

Figure 12:
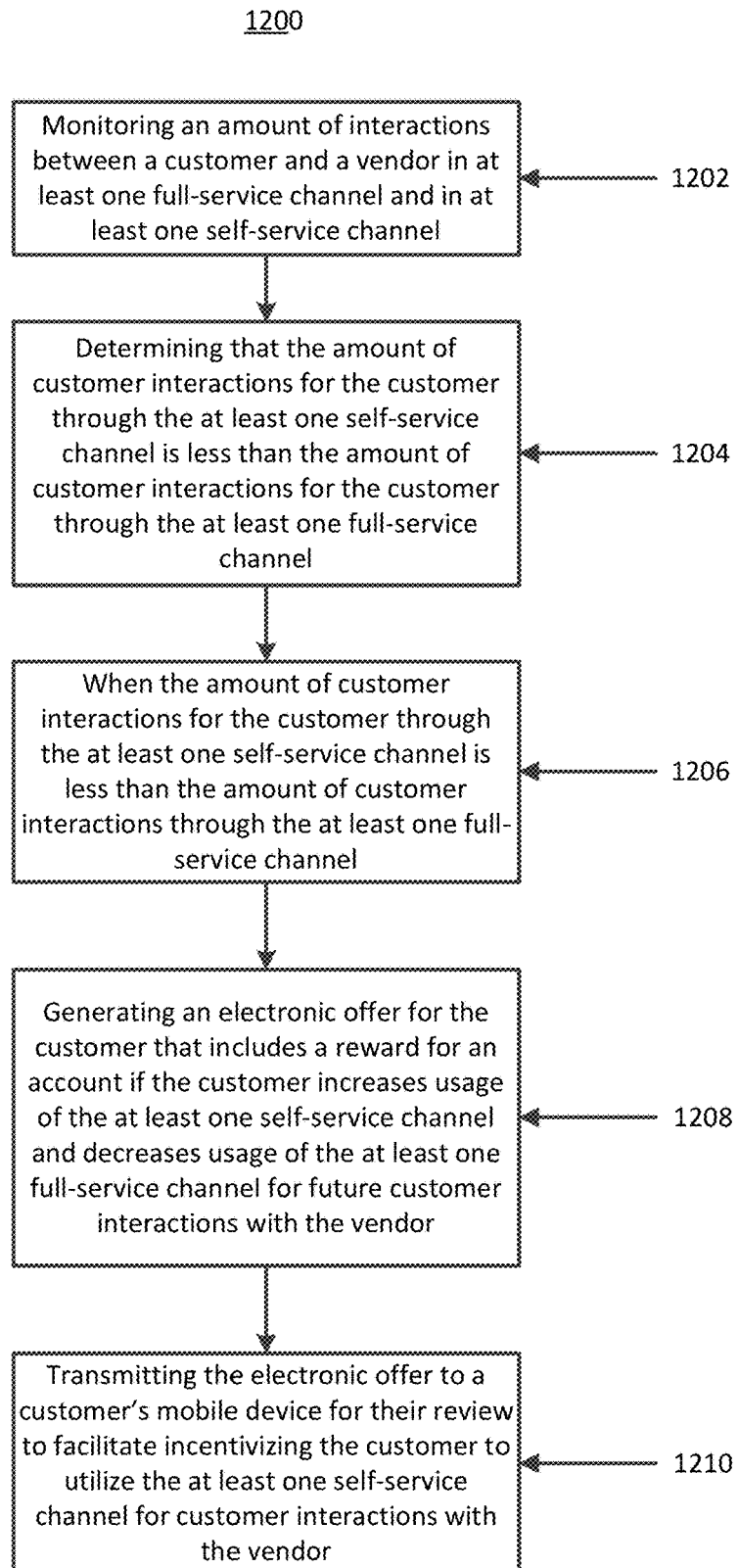
FIG. 12 illustrates an exemplary computer-implemented method 1200 for monitoring an amount of customer interactions using self-service communication channels, as opposed to full-service communication channels.

FIG. 12 illustrates an exemplary computer-implemented method 1200 for monitoring an amount of customer interactions using self-service communication channels, as opposed to full-service communication channels. The method 1200 may include: monitoring, via one or more processors, an amount of interactions between a customer and a vendor in at least one full-service channel and in at least one self-service channel (block 1202); determining, via the one or more processors, that the amount of customer interactions for the customer through the at least one self-service channel is less than the amount of customer interactions for the customer through the at least one full-service channel (block 1204); when the amount of customer interactions for the customer through the at least one self-service channel is less than the amount of customer interactions through the at least one full-service channel (block 1206); generating, via the one or more processors, an electronic offer for the customer that includes a reward for an account associated with the customer if the customer increases usage of the at least one self-service channel and decreases usage of the at least one full-service channel for future customer interactions with the vendor (block 1208); and transmitting, via the one or more processors, the electronic offer to a customer's mobile device for their review to facilitate incentivizing the customer to utilize the at least one self-service channel for customer interactions with the vendor (block 1210). The method 1200 may include additional, less, or alternate actions, including those discussed elsewhere herein.

In some embodiments, the computer implemented method may further comprise depositing, via the one or more processors, the reward into the account associated with the customer. Similarly, monitoring customer interactions (block 1202) may further comprise: receiving, via the one or more processors, transaction data associated with transactions incurred by the customer; generating, via the one or more processors, a customer shopping profile based upon the transaction data, wherein the customer shopping profile comprises customer shopping trends; and customizing, via the one or more processors, the reward to the customer shopping trends using the customer shopping profile.

In some embodiments, the customer shopping profile includes data indicative of at least one vendor at which the customer shops, an education level for the customer, what offerings the customer purchases, the type of offerings the customer purchases, or some combination thereof. In other embodiments, the at least one self-service channel is used by the customer for enrollment (e.g., into an automatic payment program), receiving e-statements, visiting a website associated with the vendor, or some combination thereof.

Targeted Loan Offers to Customers

Figure 13:
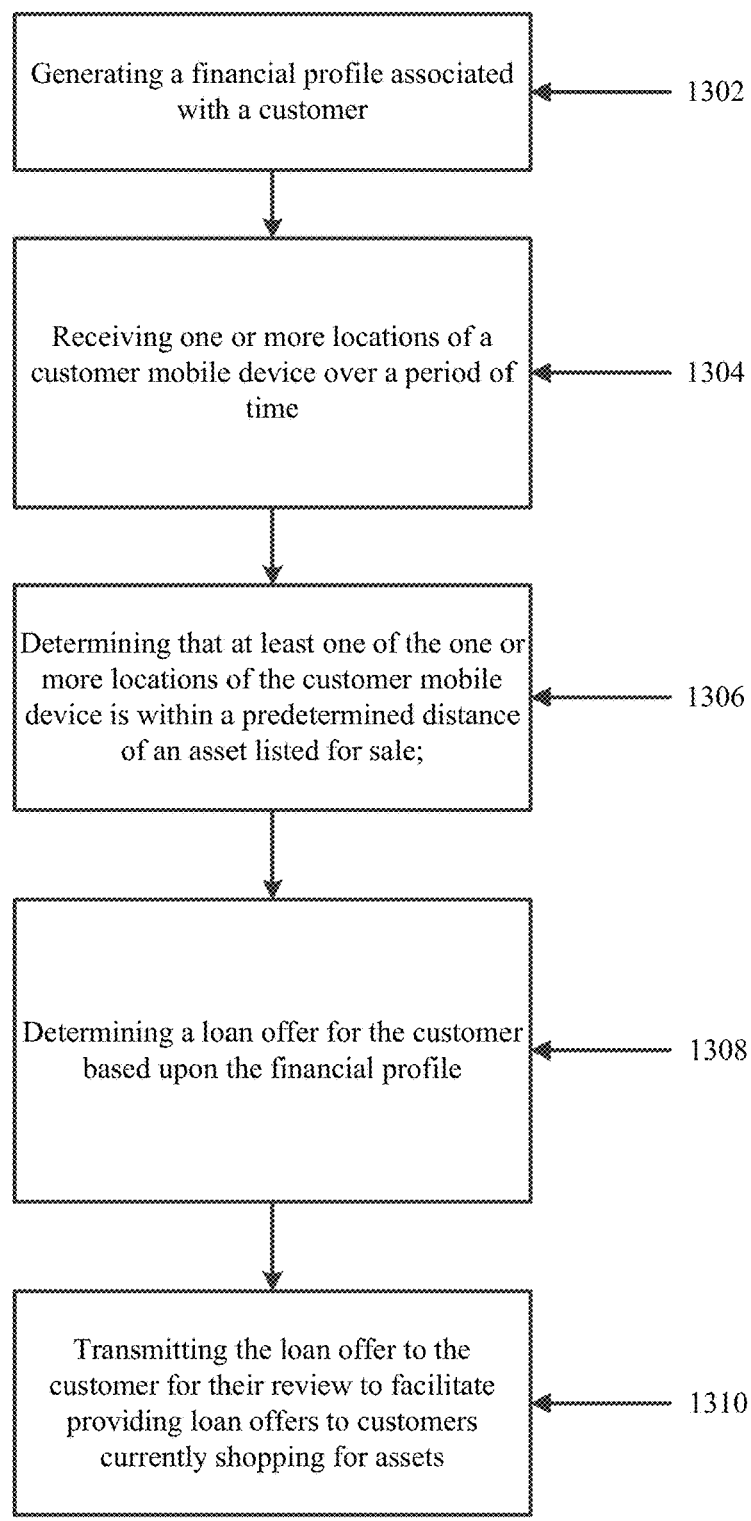
FIG. 13 illustrates an exemplary computer-implemented method flow 1300 in accordance with one aspect of the present disclosure.

FIG. 13 illustrates an exemplary computer-implemented method 1300 in accordance with one aspect of the present disclosure. In the present aspects, one or more portions of method 1300 (or the entire method 1300) may be implemented by any suitable device, and one or more portions of method 1300 may be performed by more than one suitable device in combination with one another. For example, one or more portions of method 1300 may be performed by client device 102 and/or personalized banking engine 120, as shown in FIG. 1. In one embodiment, method 1300 may be performed by any suitable combination of one or more processors, applications, algorithms, and/or routines. For example, method 1300 may be performed via one or more processors 122 executing instructions stored in cognitive computing and predictive modeling application 127, and/or instructions stored in commercial communication module 133, in conjunction with data collected, received, and/or generated via personalized banking engine 120.

The method 1300 may include generating a financial profile associated with a customer (block 1302). The shopping profile may include a dataset including the received financial transaction data, and/or other data indicative of a user's shopping preferences (e.g., favorite stores, favorite products), or transaction history. The method 1300 may include receiving one or more locations of a customer mobile device over a period of time (block 1304), and determining that at least one of the one or more locations of the customer mobile device is within a predetermined distance of an asset listed for sale (block 1306). Whether a user is at, or near, the location of an asset listed for sale may be determined by the user's mobile device crossing a predetermined threshold distance of the physical asset location. The threshold distance may be decided by the user, by a vendor selling the asset, or by personalized banking engine 120. The threshold distance may be the customer mobile device being within the same zip code as the asset listed for sale, the customer mobile device being within 10 feet, 100 feet, or 1000 feet of the asset listed for sale, etc.

The method 1300 may include determining a loan offer for the customer based upon the financial profile (block 1308), and transmitting the loan offer to the customer for their review to facilitate providing loan offers to customers currently shopping for assets (block 1310). The method may base the loan offer on the financial profile by analyzing the user's financial profile to determine a risk level for the customer, a financial ability of the customer to repay, and/or other relevant metrics. The other relevant metrics may be determined by the system by performing historical analysis of other customer's financial profiles to see which metrics correlate to failure to pay back loans. The method may also use cognitive computing, machine learning, or predictive analytics to compare the customer's financial profile to other users' financial profiles and determine which loan offer to offer the customer. The method may include additional, less, or alternate actions, including those discussed elsewhere herein.

For example, in some embodiments the method may include receiving the one or more locations of a customer mobile device over a period of time (block 1304), which further comprises receiving the locations over a day, a week, or a month. The locations may be received from the customer's mobile device, from a vehicle used by the customer, or from a cellular network that tracks the customer's mobile device.

In some embodiments, the method may include determining the loan offer (block 1308) and may further comprise adjusting a loan length, a loan interest rate, or some combination thereof, for the loan offer based upon the customer's financial profile. Similarly, in some embodiments determining the loan details (e.g., the loan length, the loan interest rate) may include utilizing a predictive analytics or cognitive computing algorithm that compares the customer to existing customers for a vendor selling the asset listed for sale.

In some embodiments, the financial profile includes net worth, net income, credit rating, credit score, or some combination thereof, for the customer. The customer's net worth may be the total assets the customer owns minus the total liabilities for which the customer is liable. The net income for the customer may be the amount of earnings over a period of time the customer has left over after all of the customer's expenses over the period of time have been subtracted from all of the customer's earnings. The customer's credit rating may be an estimate of the ability of the customer to pay off all of his or her financial obligations, or meet new financial obligations. Similarly, the customer's credit score may be a number, calculated by analyzing a customer's financial profile, that is indicative of the customer's ability to pay off a loan, or a number indicative of his or her general credit worthiness. Both the credit rating and credit score may be used to determine the customer's overall financial risk to a lending institution, such as the vendor offering the asset for sale.

In some embodiments, the financial profile includes customer longevity, customer loyalty, or some combination thereof. The customer longevity may be how long a customer has been a customer of a vendor. The customer loyalty may be a metric used by a vendor to indicate how loyal a customer is to the vendor. The metric may include how long the customer has been a customer of the vendor, how frequently the customer shops at the vendor, how much money the customer spends at the vendor, or some combination thereof.

In some embodiments the financial profile for the customer includes a predicted life event, and the loan offer is based upon the predicted life event. Similarly, the predicted life event may be the customer or the customer's children graduating from high school or college. The predicted life event may be an age-related event, and the loan offer may be an offer for a vehicle loan. The age-related event may be the customer or a member of the customer's family turning a certain age. In other embodiments, the predicted life event includes a birth of a child, a marriage, an increase in income, or a move to a new residence for the customer.

Exemplary Use Case for Presenting Targeted Loan Offers

Figure 14:
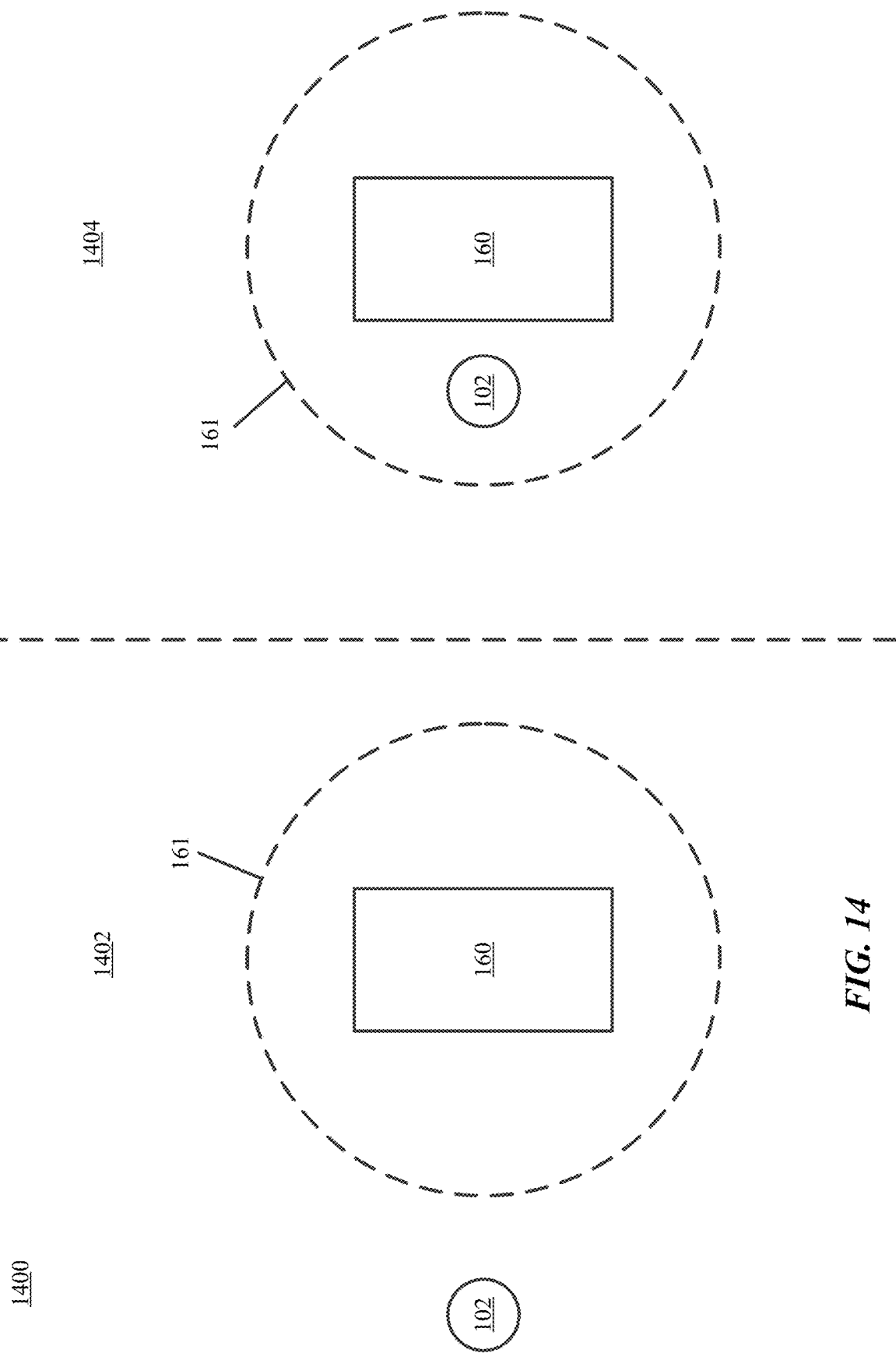
FIG. 14 illustrates an exemplary use case 1400 in accordance with one aspect of the present disclosure.

FIG. 14 illustrates an exemplary use case 1400 for presenting targeted loan offers to customers via a mobile device. FIG. 14 includes a first time period 1402, a second time period 1404, a client device 102, a retailer 160, and a boundary 161. The use case 1400 illustrated in FIG. 14 may be an example operation of the disclosed systems and methods for presenting targeted loan offers to a customer via a mobile device. During time period 1402, a user (not shown) may be in possession of client device 102. Client device 102 is in relative proximity to retailer 160. However, client device 102 has not crossed boundary 161. Boundary 161 may be the geofence described above as determined by client device 102, personalized banking engine 120, retailer 160, or some combination thereof. During time period 1402, personalized banking engine 120, or client device 102, may generate a financial profile for the customer. Personalized banking engine 120, or client device 102, may use any of the different types of methods described above to generate the financial profile. In some embodiments, the financial profile is not built until after the user has crossed boundary 161.

At time period 1404, the user and client device 102 have crossed boundary 161 and are located within proximity of retailer 160. Between time periods 1402 and 1404, the customer mobile device may receive multiple locations for the customer. At time 1404, personalized banking engine 120, or client device 102, may determine that the user is located within a threshold distance of retailer 160 and a predetermined distance of the asset listed for sale. The multiple received locations for the customer mobile device may be over a period of time, and be derived from the customer driving by the asset listed for sale multiple times over the period of time. Personalized banking engine 120, or client device 102, may determine a personalized loan offer to transmit to the customer (via his or her mobile device) for financing that the customer can take advantage of to purchase the asset listed for sale. Personalized banking engine 120, or client device 102, may determine the loan offer by analyzing the customer's financial profile. Once the loan offer is determined the loan offer may be transmitted to the customer via his or her mobile device.

Technical Advantages

The aspects described herein may be implemented as part of one or more computer components (such as a client device) and/or one or more back-end components (such as a personalized banking engine), for example. Furthermore, the aspects described herein may be implemented as part of a computer network architecture and/or a cognitive computing (or machine learning) architecture that facilitates communications between various other devices and/or components. Thus, the aspects described herein address and solve issues of a technical nature that are necessarily rooted in computer technology.

For instance, some aspects include analyzing various sources of data to predict whether a user will likely spend money at a particular retailer, and how much. Once this is determined, the aspects may also allow for a determination of whether the predicted transaction amount will negatively influence a user's financial accounts. In doing so, the aspects may overcome issues associated with the inconvenience of manual and/or unnecessary funds transfers. Without the improvements suggested herein, additional processing and memory usage may be required to perform such transfers, as a client device may need to download additional data and process this data as part of the transfer process.

Furthermore, the embodiments described herein may function to optimize the interest accrued across a user's accounts. The process may improve upon existing technologies by more accurately forecasting a user's account balance using additional data sources. Due to this increase in accuracy, the aspects may address computer-related issues regarding efficiency over the traditional amount of processing power and models used to forecast financial data. Thus, the aspects may also address computer related issues that are related to efficiency metrics, such as consuming less power, for example.

Additional Considerations

This detailed description is to be construed as exemplary only and does not describe every possible embodiment, as describing every possible embodiment would be impractical, if not impossible. One may implement numerous alternate embodiments, using either current technology or technology developed after the filing date of this application.

Further to this point, although the embodiments described herein often utilize credit report information as an example of sensitive information, the embodiments described herein are not limited to such examples. Instead, the embodiments described herein may be implemented in any suitable environment in which it is desirable to identify and control specific type of information. For example, the aforementioned embodiments may be implemented by a financial institution to identify and contain bank account statements, brokerage account statements, tax documents, etc. To provide another example, the aforementioned embodiments may be implemented by a lender to not only identify, re-route, and quarantine credit report information, but to apply similar techniques to prevent the dissemination of loan application documents that are preferably delivered to a client for signature in accordance with a more secure means (e.g., via a secure login to a web server) than via email.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software), may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of some of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method, comprising:
    training, by one or more processors, a machine learning model using historical data associated with user profiles, and indicative of corresponding amounts spent at retailers;
    generating, by the one or more processors, a user profile of a user, the user profile indicating at least a current account balance for a first financial account of the user based on financial account data;
    determining, by the one or more processors, that a location of a mobile device of the user is within a threshold distance of a particular retailer;
    based at least in part on determining that the location is within the threshold distance, determining, by the one or more processors, using the machine learning model, and based at least in part on the user profile, a predicted transaction amount that the user, while the mobile device is within the threshold distance, is likely to spend at the particular retailer;
    determining, by the one or more processors, that the predicted transaction amount exceeds the current account balance;
    selectively transmitting, by the one or more processors, a notification of a potential overdraft to the mobile device, wherein the notification is transmitted based on:
        (i) the determining that the predicted transaction amount exceeds the current account balance, and
        (ii) the determining that the location is within the threshold distance; and
    transmitting, by the one or more processors and to one or more financial institutions over a communication network, without being prompted by the user and in response to determining that the predicted transaction amount exceeds the current account balance, an automatic request to transfer funds from a second financial account of the user to the first financial account, an amount of the funds being within a threshold range of the predicted transaction amount.

2. The computer-implemented method of claim 1, wherein calculating the predicted transaction amount comprises:
    calculating the predicted transaction amount as an output of a weighting function that weights a plurality of inputs that include (i) an identifier of the particular retailer, and (ii) one or more elements of demographic information of the user indicated by the user profile.

3. The computer-implemented method of claim 2, wherein the demographic information includes an age, an income level, and a geographic region of the user.

4. The computer-implemented method of claim 1, wherein:
the user is a first user,
the historical data indicates an average amount spent by each of a plurality of second users at the particular retailer over a period of time, and
calculating the predicted transaction amount comprises:
identifying, by the one or more processors, a subset of the plurality of second users having demographic information that corresponds the first user,
calculating an average amount spent at the particular retailer by the subset of the plurality of second users, and
calculating the predicted transaction amount based at least in part on the average amount.

5. The computer-implemented method of claim 1, wherein:
the user is a first user associated with first demographic information,
the historical data further indicates:
second demographic information associated with each of a plurality of second users, and
an average amount spent by each of the plurality of second users at the particular retailer over a period of time, and
the method further comprises:
identifying, by the one or more processors, a subset of the plurality of second users having the second demographic information that corresponds to the first demographic information of the first user; and
identifying, by the one or more processors, one or more dominant portions of the second demographic information that causes a greatest variance in the average amount spent by each of the subset of the plurality of second users.

6. The computer-implemented method of claim 5, wherein calculating the predicted transaction amount comprises:
calculating the predicted transaction amount as an output of a weighting function that weights a plurality of inputs in at least the first demographic information, and
wherein one or more inputs in the first demographic information are weighted based upon the one or more dominant portions of the second demographic information.

7. The computer-implemented method of claim 1, wherein generating the user profile further comprises:
calculating, by the one or more processors, an average daily account balance associated with the first financial account based upon the financial account data.

8. A computer system, comprising:
one or more processors; and
memory storing computer-executable instructions that, when executed by the one or more processors, cause the one or more processors to:
train a machine learning model using historical data associated with user profiles, and indicative of corresponding amounts spent at retailers;
generate a user profile of a user, the user profile indicating at least a current account balance for a first financial account of the user based on financial account data;
determine that a location of a mobile device of the user is within a threshold distance of a particular retailer based upon location data transmitted by the mobile device;
based at least in part on determining that the location is within the threshold distance, determine, using the machine learning model, and based at least in part on the user profile, a predicted transaction amount that the user, while the mobile device is within the threshold distance, is likely to spend at the particular retailer;
determine that the predicted transaction amount exceeds the current account balance;
selectively transmit a notification of a potential overdraft to the mobile device, wherein the notification is transmitted based on:
(i) determining that the predicted transaction amount exceeds the current account balance, and
(ii) determining that the location is within the threshold distance; and
transmit, to one or more financial institutions over a communication network, without being prompted by the user and in response to determining that the predicted transaction amount exceeds the current account balance, an automatic request to transfer funds from a second financial account of the user to the first financial account, an amount of the funds being within a threshold range of the predicted transaction amount.

9. The computer system of claim 8, wherein the computer-executable instructions cause the one or more processors to calculate the predicted transaction amount as an output of a weighting function that weights a plurality of inputs that include (i) an identifier of the particular retailer, and (ii) one or more elements of demographic information of the user indicated by the user profile.

10. The computer system of claim 9, wherein the demographic information includes an age, an income level, and a geographic region of the user.

11. The computer system of claim 8, wherein:
the user is a first user,
the historical data indicates an average amount spent by each of a plurality of second users at the particular retailer over a period of time, and
the computer-executable instructions further cause the one or more processors to:
identify a subset of a plurality of second users having demographic information that matches that of the first user;
calculate an average amount spent at the particular retailer by the subset of the plurality of second users; and
calculate the predicted transaction amount based at least in part on the average amount.

12. The computer system of claim 8, wherein:
the user is a first user associated with first demographic information, the historical data further indicates:
(i) an average amount spent by each of a plurality of second users at the particular retailer over a period of time, and
(ii) second demographic information associated with each of the plurality of second users, and
the computer-executable instructions further cause the one or more processors to:

identify a subset of the plurality of second users having the second demographic information that corresponds to the first demographic information of the user; and identify one or more dominant portions of the second demographic information that causes a greatest variance in the average amount spent by each of the subset of the plurality of second users.

13. The computer system of claim 12, wherein the computer-executable instructions further cause the one or more processors to:

calculate the predicted transaction amount as an output of a weighting function that weights a plurality of inputs in at least the first demographic information, wherein one or more inputs in the first demographic information are weighted based upon the one or more dominant portions of the second demographic information.

14. The computer system of claim 8, wherein the computer-executable instructions further cause the one or more processors to generate the user profile by calculating an average daily account balance associated with the first financial account based upon the financial account data.

15. A method, comprising:

training a machine learning model using historical data associated with user profiles, and indicative of corresponding amounts spent at retailers;

identifying a current account balance for a first account of a user, the first account being associated with a first interest rate;

receiving, from a device associated with the user over a communication network, data indicative of a first location of the user;

determining that the first location of the user is within a threshold distance of a second location of a particular retailer;

based at least in part on determining that the first location is within the threshold distance of the second location, determining, using the machine learning model, and based at least in part on a user profile associated with the user, a predicted transaction amount that the user, while within the threshold distance, is likely to spend at the particular retailer;

determining that the predicted transaction amount exceeds the current account balance; and based on determining (i) that the first location of the user is within the threshold distance of the second location and (ii) that the predicted transaction amount exceeds the current account balance, transmitting, to one or more financial institutions over the communication network and without being prompted by the user, an automatic request to transfer funds from a second account of the user to the first account, an amount of the funds being within a threshold range of the predicted transaction amount, wherein the second account is associated with a second interest rate that is greater than the first interest rate.

16. The method of claim 15, wherein the first account comprises a checking account and the second account comprises a savings account.

17. The computer-implemented method of claim 2, wherein one or more weights of the weighting function are determined by the machine learning model based at least in part on the training.

18. The computer system of claim 9, wherein one or more weights of the weighting function are determined by the machine learning model based at least in part on training of the machine learning model.

19. The computer-implemented method of claim 1, further comprising:

determining, by the one or more processors, that a probability of the user spending the predicted transaction amount is greater than or equal to a threshold probability; and transmitting, by the one or more processors, the notification of the potential overdraft and the automatic request to transfer the funds based at least in part on the determining that the probability is greater than or equal to the threshold probability.

20. The computer system of claim 8, wherein the computer-executable instructions further cause the one or more processors to:

determine that a probability of the user spending the predicted transaction amount is greater than or equal to a threshold probability; and transmit the notification of the potential overdraft and the automatic request to transfer the funds based at least in part on the determining that the probability is greater than or equal to the threshold probability.

* * * * *